(12) United States Patent
Parundekar et al.

(10) Patent No.: US 9,792,331 B2
(45) Date of Patent: Oct. 17, 2017

(54) CONTENT RECOMMENDATION BASED ON EFFICACY MODELS

(71) Applicant: TOYOTA JIDOSHA KABUSHIKI KAISHA, Toyota-shi, Aichi-ken (JP)

(72) Inventors: Rahul Parundekar, Sunnyvale, CA (US); Kentaro Oguchi, Menlo Park, CA (US); Roger Melen, Los Altos Hills, CA (US); Daisuke Hiroki, Toda (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 320 days.

(21) Appl. No.: 14/085,452

(22) Filed: Nov. 20, 2013

(65) Prior Publication Data

US 2015/0142789 A1   May 21, 2015

(51) Int. Cl.
| | |
|---|---|
| *G06F 7/00* | (2006.01) |
| *G06F 17/30* | (2006.01) |
| *G06Q 30/02* | (2012.01) |
| *G06Q 30/06* | (2012.01) |
| *G06Q 50/00* | (2012.01) |

(52) U.S. Cl.
CPC .... *G06F 17/3053* (2013.01); *G06F 17/30241* (2013.01); *G06Q 30/0251* (2013.01); *G06Q 30/0631* (2013.01); *G06Q 50/01* (2013.01)

(58) Field of Classification Search
None
See application file for complete search history.

(56) References Cited

U.S. PATENT DOCUMENTS

| | | |
|---|---|---|
| 6,212,473 B1 | 4/2001 | Stefan et al. |
| 6,385,542 B1 | 5/2002 | Millington |
| 6,542,812 B1 | 4/2003 | Obradovich et al. |

(Continued)

FOREIGN PATENT DOCUMENTS

| | | |
|---|---|---|
| JP | 11-337361 A | 12/1999 |
| JP | 2001-215124 A | 8/2001 |

(Continued)

OTHER PUBLICATIONS

International Search Report and Written Opinion, PCT/JP2014/002597 mailed Jul. 25, 2014 (10 pages).

*Primary Examiner* — Hasanul Mobin
(74) *Attorney, Agent, or Firm* — Patent Law Works LLP

(57) ABSTRACT

The disclosure includes a system and method for providing recommendation items to users. The system includes a processor and a memory storing instructions that when executed cause the system to: receive identification input data associated with a user; identify the user using the identification input data; receive sensor data; determine a current situation associated with the user from one or more predefined situations described by predefined situation data and associated parameters; receive data describing a set of candidate items; generate a set of efficacy scores for the set of candidate items; eliminate one or more candidate items from the set of candidate items to obtain one or more remaining candidate items; rank the one or more remaining candidate items based on one or more associated efficacy scores; and provide one or more recommendation items to the user from the one or more ranked remaining candidate items.

27 Claims, 23 Drawing Sheets

(56) References Cited

U.S. PATENT DOCUMENTS

| | | | |
|---|---|---|---|
| 7,809,601 B2* | 10/2010 | Shaya | G06Q 30/02 |
| | | | 700/233 |
| 7,958,119 B2 | 6/2011 | Eggnik et al. | |
| 2002/0107735 A1* | 8/2002 | Henkin | G06F 17/30899 |
| | | | 705/14.55 |
| 2004/0066330 A1* | 4/2004 | Knockeart | G01C 21/3415 |
| | | | 342/357.31 |
| 2004/0141354 A1* | 7/2004 | Carnahan | G06F 17/30864 |
| | | | 365/145 |
| 2004/0193492 A1 | 9/2004 | Applebaum | |
| 2005/0024189 A1 | 2/2005 | Weber | |
| 2006/0047678 A1* | 3/2006 | Miyazaki | H04N 21/25891 |
| 2007/0100805 A1* | 5/2007 | Ramer | G06F 17/30864 |
| 2008/0228587 A1 | 9/2008 | Slaney et al. | |
| 2008/0288406 A1 | 11/2008 | Seguin et al. | |
| 2009/0006194 A1 | 1/2009 | Sridharan et al. | |
| 2009/0204600 A1 | 8/2009 | Kalik et al. | |
| 2010/0211304 A1* | 8/2010 | Hwang | G01C 21/3484 |
| | | | 701/532 |
| 2010/0250370 A1* | 9/2010 | Jones | G06Q 10/06 |
| | | | 705/14.66 |
| 2010/0302056 A1 | 12/2010 | Dutton et al. | |
| 2010/0305855 A1 | 12/2010 | Dutton et al. | |
| 2010/0331016 A1 | 12/2010 | Dutton et al. | |
| 2011/0029398 A1* | 2/2011 | Boudville | G06F 17/3087 |
| | | | 705/26.1 |
| 2011/0145040 A1 | 6/2011 | Zahn et al. | |
| 2011/0238608 A1 | 9/2011 | Sathish | |
| 2014/0041055 A1 | 2/2014 | Shaffer et al. | |
| 2014/0088961 A1 | 3/2014 | Woodward et al. | |
| 2014/0136187 A1* | 5/2014 | Wolverton | G06F 17/30654 |
| | | | 704/9 |
| 2014/0180982 A1* | 6/2014 | Murphy | G06N 5/04 |
| | | | 706/14 |

FOREIGN PATENT DOCUMENTS

| | | |
|---|---|---|
| JP | 2003-194563 A | 7/2003 |
| JP | 2006-185189 A | 7/2006 |
| JP | 2007-256959 A | 10/2007 |
| JP | 2009-217397 A | 9/2009 |

* cited by examiner

CONTENT RECOMMENDATION BASED ON EFFICACY MODELS

BACKGROUND

The specification relates to content recommendation. In particular, the specification relates to a system for providing recommendation items to users based on efficacy models.

A user may request content items from a content recommendation system while driving a vehicle. For example, the user may request for podcasts to be played in the in-vehicle infotainment system. However, existing content recommendation systems often recommend content items to the user based on what the user wants and fail to recommend content items based on what the user needs in a specific situation. For example, existing content recommendation systems may provide audio items to the user in situations where the recommendation of audio items is ineffective and distracts the user from driving.

SUMMARY

According to one innovative aspect of the subject matter described in this disclosure, a system for providing recommendation items to users based on efficacy models includes a processor and a memory storing instructions that, when executed, cause the system to: receive identification input data associated with a user; identify the user using the identification input data; receive sensor data; determine, based on the sensor data, a current situation associated with the user from one or more predefined situations described by predefined situation data and associated parameters; receive data describing a set of candidate items; generate a set of efficacy scores for the set of candidate items based on the current situation and a user efficacy model associated with the user; eliminate one or more candidate items from the set of candidate items to obtain one or more remaining candidate items; rank the one or more remaining candidate items based on one or more efficacy scores associated with the one or more remaining candidate items; and provide one or more recommendation items to the user from the one or more ranked remaining candidate items.

In general, another innovative aspect of the subject matter described in this disclosure may be embodied in methods that include: receiving identification input data associated with a user; identifying the user using the identification input data; receiving sensor data; determining, based on the sensor data, a current situation associated with the user from one or more predefined situations described by predefined situation data and associated parameters; receiving data describing a set of candidate items; generating a set of efficacy scores for the set of candidate items based on the current situation and a user efficacy model associated with the user; eliminating one or more candidate items from the set of candidate items to obtain one or more remaining candidate items; ranking the one or more remaining candidate items based on one or more efficacy scores associated with the one or more remaining candidate items; and providing one or more recommendation items to the user from the one or more ranked remaining candidate items.

Other aspects include corresponding methods, systems, apparatus, and computer program products for these and other innovative aspects.

These and other implementations may each optionally include one or more of the following features. For instance, the operations include: receiving stakeholder efficacy data defined by a stakeholder; generating the user efficacy model based on one or more of the current situation and the stakeholder efficacy data; generating the set of efficacy scores further based on the stakeholder efficacy data; aggregating device data associated with a mobile computing device; determining device bias data describing one or more scoring preferences configured for the mobile computing device; generating the set of efficacy scores further based on the device data and the device bias data; determining, based on the current situation, a situational bias model that describes one or more situational constraints to be satisfied; generating the user efficacy model based on the current situation and the situational bias model; determining that a historical user efficacy model associated with the user exists; generating the user efficacy model based on the current situation and the historical user efficacy model; retrieving a group efficacy model associated with the user; generating the user efficacy model based on the current situation and the group efficacy model; retrieving user profile data associated with the user; retrieving user social data associated with the user; generating user attribute data associated with the user based on the user profile data and the user social data; generating the user efficacy model based on one or more of the user attribute data and the current situation; generating the set of efficacy scores further based on the user attribute data; identifying one or more items consumed by the user; identifying one or more affinity states for the one or more consumed items; retrieving item social data associated with the one or more consumed items; generating item attribute data associated with the one or more consumed items based on the one or more affinity states and the item social data; classifying the one or more consumed items to one or more groups; determining one or more group identifiers that identify the one or more groups; generating the user efficacy model based on one or more of the item attribute data, the current situation and the one or more group identifiers; determining a trip start point, a trip stop-off point and a trip end point associated with a trip based on the sensor data; retrieving data describing a trip history associated with the user; determining a trip offset distance based on one or more of the trip history, the trip start point, the trip stop-off point and the trip end point; aggregating device data associated with a mobile computing device; generating travel mobility data associated with the mobile computing device, the travel mobility data including one or more of the trip start point, the trip end point, the trip stop-off point, the trip offset distance and the device data; and generating the set of efficacy scores further based on the travel mobility data.

The present disclosure is particularly advantageous in a number of respects. First, the system is not only capable of recommending items to a user based on what the user wants, but also capable of recommending items to the user based on what the user needs. For example, the system creates a user efficacy model associated with the user and applies the user efficacy model to generate recommendation items for the user in a way that the content recommendation for the user achieves a desired effect. The content recommendation may, in some cases, achieve an efficacy of legality, safety, financial considerations, situational considerations or other considerations. Second, the user efficacy model used to generate efficacy scores for candidate items is dynamic and is configured based on the user's current situation, stakeholder efficacy data and other data. Thus, effective, desirable, and relevant content recommendations can be provided to the user based on the user efficacy model. It should be understood that the forgoing advantages are provided by way of example and the system may have numerous other advantages and benefits.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Overview

Figure 1:
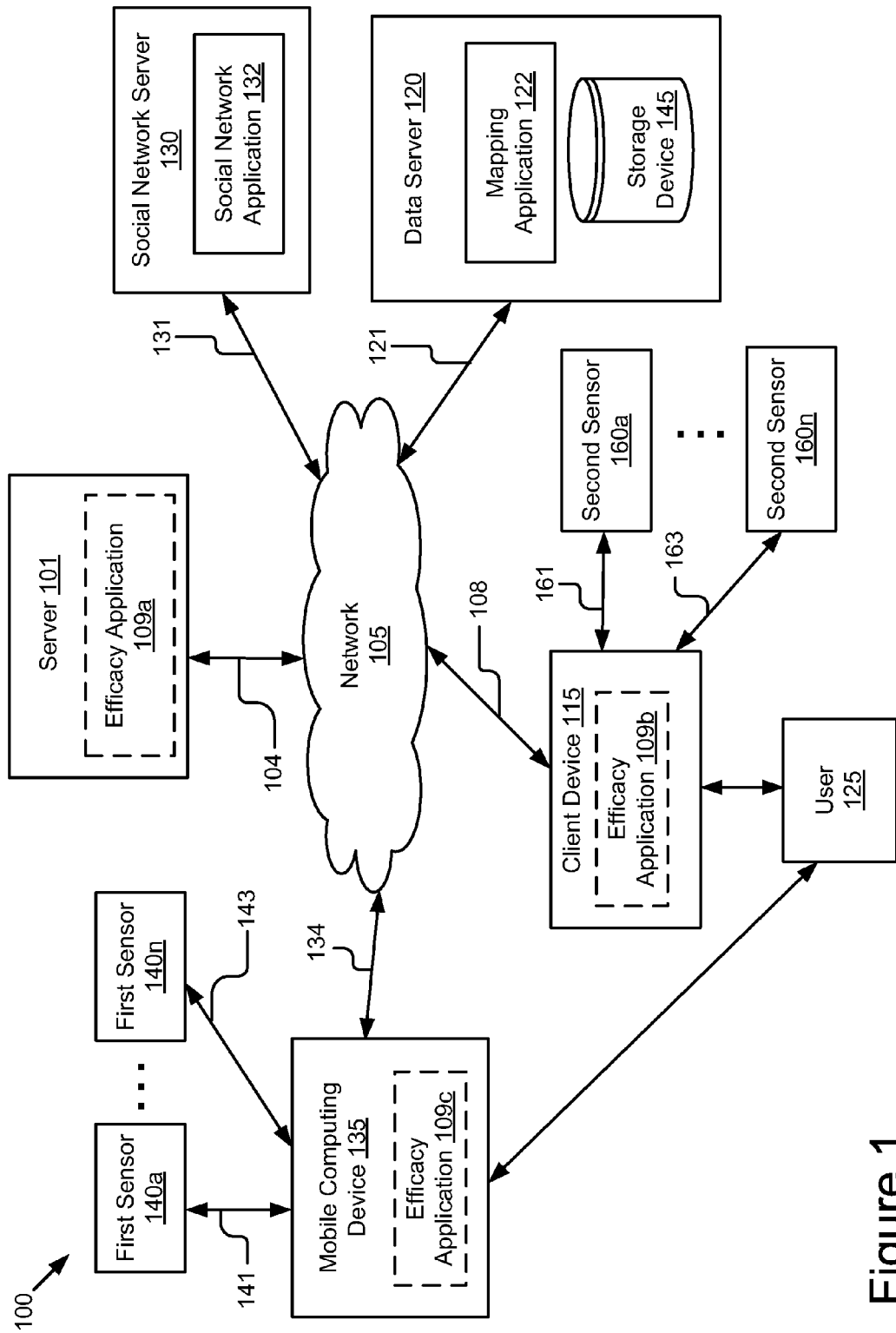
FIG. 1 is a block diagram illustrating an example system for providing recommendation items to users based on efficacy models.

FIG. 1 illustrates a block diagram of a system 100 for providing recommendation items to users based on efficacy models according to some embodiments. The illustrated system 100 includes a server 101, a client device 115, a mobile computing device 135, a social network server 130 and a data server 120. The entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data using a variety of different communication protocols. In some embodiments, the network 105 includes BLUETOOTH® communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the server 101, the client device 115, the mobile computing device 135, the social network server 130 and the data server 120, in practice one or more networks 105 can be connected to these entities.

In some embodiments, the efficacy application 109a is operable on the server 101, which is coupled to the network 105 via signal line 104. The server 101 can include a hardware and/or virtual server that includes a processor, a memory and network communication capabilities. In some embodiments, the server 101 sends and receives data to and from one or more of the social network server 130, the client device 115, the data server 120 and the mobile computing device 135. Although FIG. 1 illustrates one server 101, the system 100 can include one or more servers 101.

In some embodiments, the efficacy application 109b is operable on the client device 115, which is connected to the network 105 via signal line 108. In some embodiments, the client device 115 sends and receives data to and from one or more of the server 101, the data server 120, the social network server 130 and the mobile computing device 135. The client device 115 is a computing device that includes a memory and a processor, for example a laptop computer, a desktop computer, a tablet computer, a mobile telephone, a personal digital assistant (PDA), a mobile email device or any other electronic device capable of accessing a network 105. In the illustrated embodiment, the user 125 interacts with the client device 115. Although FIG. 1 illustrates one client device 115, the system 100 can include one or more client devices 115.

In some instances, the efficacy application 109b can act in part as a thin-client application that may be stored on the client device 115 and in part as components that may be stored on one or more of the server 101 and the mobile computing device 135. For example, the server 101 determines recommendation items for a user and generates graphical data for providing a user interface that depicts the recommendation items to the user. The efficacy application 109b may send instructions to a browser (not shown) installed on the client device 115 for presenting the user interface on a display device (not shown) coupled to the client device 115.

In some embodiments, the efficacy application 109c is operable on a mobile computing device 135, which is coupled to the network 105 via signal line 134. In some embodiments, the mobile computing device 135 sends and receives data to and from one or more of the server 101, the social network server 130, the data server 120 and the client device 115. The mobile computing device 135 is any computing device that includes a memory and a processor. In some embodiments, the mobile computing device 135 is one of a vehicle, an automobile, a bus, a bionic implant or any other mobile system with non-transitory computer electronics (e.g., a processor, a memory or any combination of non-transitory computer electronics). In the illustrated embodiment, the user 125 interacts with the mobile computing device 135. In some examples, the user 125 can be a driver driving a vehicle or a passenger sitting on a passenger seat. Although FIG. 1 illustrates one mobile computing device 135, the system 100 can include one or more mobile computing devices 135.

The efficacy application 109 is code and routines for providing recommendation items to users based on efficacy models. In some embodiments, the efficacy application 109 can be implemented using hardware including a fieldprogrammable gate array (FPGA) or an application-specific integrated circuit (ASIC). In additional embodiments, the efficacy application 109 can be implemented using a combination of hardware and software. In some embodiments, the efficacy application 109 may be stored in a combination of the devices and servers, or in one of the devices or servers. The efficacy application 109 is described below in more detail with reference to at least FIGS. 2-12 and 16.

In the embodiment shown in FIG. 1, one or more first sensors 140a . . . 140n are coupled to the mobile computing device 135. For example, the first sensor 140a is coupled to the mobile computing device 135 via signal line 141 and the first sensor 140n is coupled to the mobile computing device 135 via signal line 143. In FIG. 1 and the remaining figures, a letter after a reference number, e.g., "140a," represents a reference to the element having that particular reference number. A reference number in the text without a following letter, e.g., "140," represents a general reference to instances of the element bearing that reference number.

The first sensor 140 can be a device that measures one or more physical parameters. For example, the first sensors 140 measure one or more of a current gas mileage, engine on or off in a vehicle, parking break, CAN bus, a speed, a time of the day, a location (e.g., a latitude, longitude and altitude of the location), system safety parameters related to a vehicle (e.g., an airbag system, an anti-lock braking system, etc.), a distance from the vehicle to other objects (e.g., roadside structure, traffic lights, etc.), a distance from the vehicle to nearby vehicles, an acceleration of the vehicle, a direction of travel, a fuel tank level, a battery charge level, temperature, humidity and/or any other physical parameters associated with a vehicle, etc. In some embodiments, the first sensor 140 is one of a global positioning system (GPS), a camera, an on-board diagnostics (OBD) system, a keyboard, a touch screen, a hardware button on a steering wheel, a steering wheel controller, an engine control unit (ECU, PCM, etc.), a fingerprint reader or any other type of sensors. In some embodiments, the first sensors 140 are sensors installed in the mobile computing device 135 such as a vehicle.

In the illustrated embodiment, one or more second sensors 160a . . . 160n are coupled to the client device 115. For example, the second sensor 160a is coupled to the client device 115 via signal line 161 and the second sensor 160n is coupled to the client device 115 via signal line 163. The second sensor 160 can be a device that measures one or more physical parameters. For example, the second sensors 160 measure one or more of a speed, acceleration, a time of the day, a location (e.g., a latitude, longitude and altitude of the location), temperature, humidity and/or any other physical parameters, etc. In some embodiments, the second sensor 160 is one of a global positioning system (GPS), a camera, a keyboard, a touch screen, a fingerprint reader or any other type of sensors. In some embodiments, the second sensors 160 are sensors installed on the client device 115.

The social network server 130 can be a hardware and/or virtual server that includes a processor, a memory and network communication capabilities. In some embodiments, the social network server 130 sends and receives data to and from one or more of the client device 115, the server 101, the mobile computing device 135 and the data server 120 via the network 105. The social network server 130 includes a social network application 132. A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they may be related. Furthermore, the social network server 130 and the social network application 132 may be representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others may be of general interest or a specific focus.

The data server 120 can be a hardware and/or virtual server that includes a processor, a memory and network communication capabilities. In some embodiments, the data server 120 sends and receives data to and from one or more of the social network server 130, the server 101, the client device 115 and the mobile computing device 135. Although FIG. 1 illustrates one data server 120, the system 100 can include one or more data servers 120. In the illustrated embodiment, the data server 120 includes a mapping application 122 and a storage device 145.

The mapping application 122 can be code and routines for processing a request or a query received from the efficacy application 109. For example, the mapping application 122 receives a request for a map from the efficacy application 109. The mapping application 122 processes the request and returns data describing the map to the efficacy application 109. In another example, the mapping application 122 receives a query (e.g., a request for vehicle updates) from the efficacy application 109, retrieves data that matches the query from the storage 145 and sends the data to the efficacy application 109.

The storage device 145 can be a non-transitory memory that stores data for providing the acts and/or functionality described herein. The storage device 145 may be a dynamic random access memory (DRAM) device, a static random access memory (SRAM) device, flash memory or some other memory devices. In some embodiments, the storage device 145 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the storage device 145 may include a database management system (DBMS) for storing and providing access to data. In some embodiments, the storage device 145 acts as a cloud storage device. In some embodiments, the storage device 145 stores one or more of historical identification data associated with a user, item data describing one or more items, groups of items, a consumption history associated with a user, affinity scales for different items, affinity states associated with items, a user profile associated with a user, maps, standard situational bias models, a user request history, a user situation history, a trip history associated with a user, standard group efficacy models, average group efficacy models, user efficacy models for different users and efficacy scores for different items. The storage device 145 may store other data for providing the acts and/or functionality described herein. The data stored in the storage device 145 is described below in more detail.

Example Efficacy Application

Figure 2:
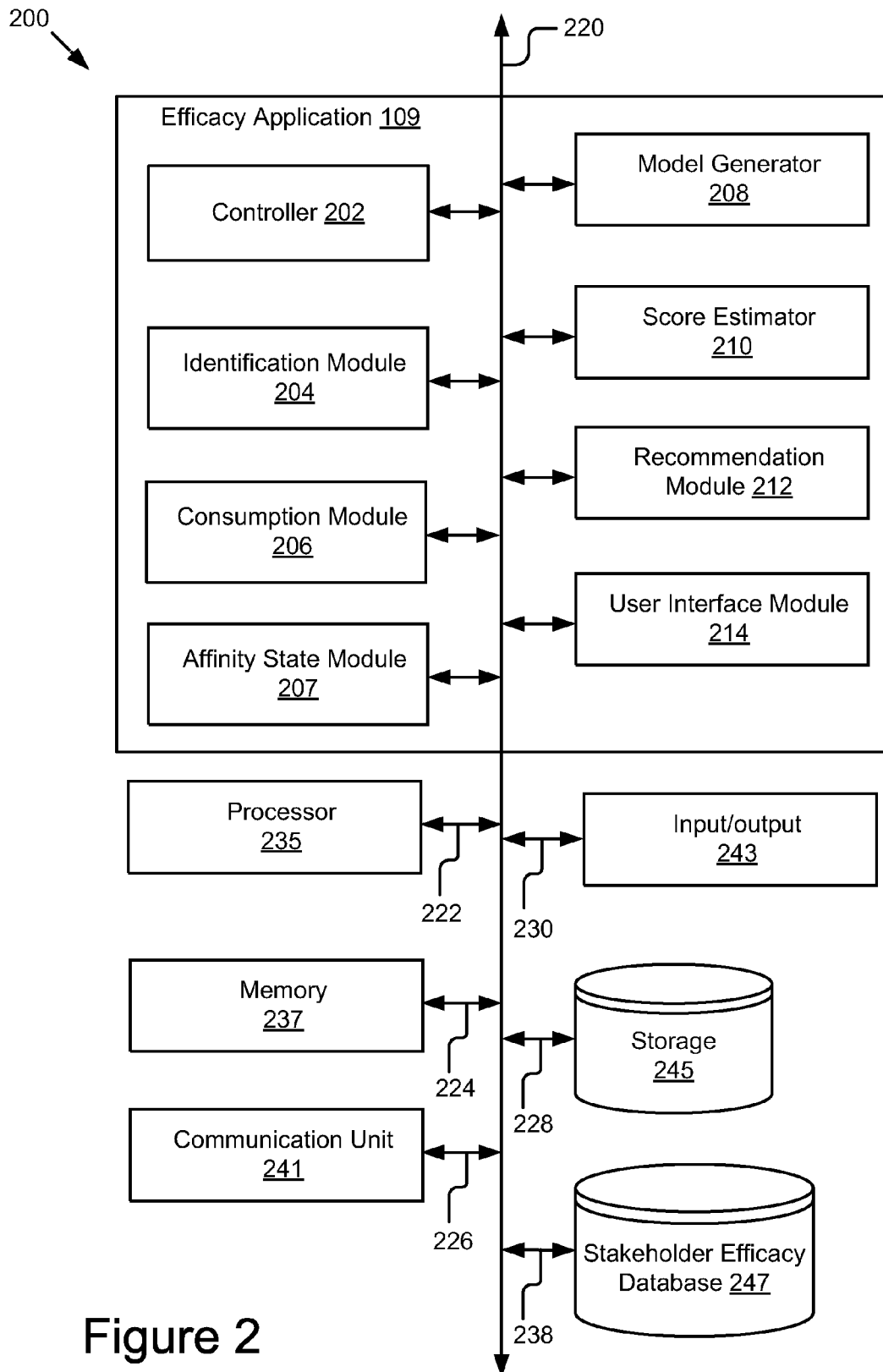
FIG. 2 is a block diagram illustrating an example of an efficacy application.

Referring now to FIG. 2, an example of the efficacy application 109 is shown in more detail. FIG. 2 is a block diagram of a computing device 200 that includes an efficacy application 109, a processor 235, a memory 237, a communication unit 241, an input/output device 243, a storage device 245 and a stakeholder efficacy database 247 according to some embodiments. The components of the computing device 200 are communicatively coupled by a bus 220. The input/output device 243 is communicatively coupled to the bus 220 via signal line 230. In various embodiments, the computing device 200 may be a server 101, a client device 115 and/or a mobile computing device 135.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that can be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the communication unit 241 is communicatively coupled to the bus 220 via signal line 226. The communication unit 241 transmits and receives data to and from one or more of the server 101, the mobile computing device 135, the client device 115, the data server 120 and the social network server 130 depending upon where the efficacy application 109 is stored. In some embodiments, the communication unit 241 includes a port for direct physical connection to the network 105 or to another communication channel. For example, the communication unit 241 includes a USB, SD, CAT-5 or similar port for wired communication with the client device 115. In some embodiments, the communication unit 241 includes a wireless transceiver for exchanging data with the client device 115 or other communication channels using one or more wireless communication methods, including IEEE 802.11, IEEE 802.16, BLUETOOTH®, dedicated short-range communications (DSRC) or another suitable wireless communication method.

In some embodiments, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The storage device 245 can be a non-transitory memory that stores data for providing the acts and/or functionality described herein. The storage device 245 may be a dynamic random access memory (DRAM) device, a static random access memory (SRAM) device, flash memory or some other memory devices. In some embodiments, the storage device 245 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the storage device 245 is communicatively coupled to the bus 220 via signal line 228. In some embodiments, the storage device 245 stores one or more of user efficacy models associated with users, group efficacy models, efficacy scores, historical identification data associated with users, user identifiers (IDs) that identify users, user attribute data, item attribute data, affinity scales for different items, affinity states associated with different items, travel mobility data, situation data, user situation histories, situational bias models, standard situational bias models, different groups of items, group IDs, consumption histories associated with users, user profiles, maps, standard situational bias models, user request histories, trip histories associated with users, standard group efficacy models and average group efficacy models. The data stored in the storage device 245 is described below in more detail. In some embodiments, the storage device 245 may store other data for providing the acts and/or functionality described herein.

The stakeholder efficacy database 247 stores stakeholder efficacy data defined by stakeholders. The stakeholder efficacy database 247 is communicatively coupled to the bus 220 via signal line 238. Example stakeholders include, but are not limited to, an entity that produces the mobile computing device 135 (e.g., a vehicle manufacturer), an entity that sells the mobile computing device 135 and an entity that rents the mobile computing device 135 to users (e.g., a vehicle rental company).

Stakeholder efficacy data can be data describing one or more content recommendation constraints configured by one or more stakeholders. For example, the stakeholder efficacy data describes one or more constraints defining what kind of recommendation items are efficacious to users. In some embodiments, the constraints are configured based on one or more of what user experience a stakeholder likes a user to have, safety priority, legality considerations, financial considerations and other considerations. For example, a constraint in the stakeholder efficacy data indicates not to recommend music to a user when the user is merging lanes on a highway even if the user requests for music recommendation at that time. In another example, a constraint in the stakeholder efficacy data indicates not to recommend any bars to drivers under 21 years old. Other example constraints in the stakeholder efficacy data are possible.

In the illustrated embodiment, the efficacy application 109 includes a controller 202, an identification module 204, a consumption module 206, an affinity state module 207, a model generator 208, a score estimator 210, a recommendation module 212 and a user interface module 214. These components of the efficacy application 109 are communicatively coupled via the bus 220.

The controller 202 can be software including routines for handling communications between the efficacy application 109 and other components of the computing device 200. In some embodiments, the controller 202 can be a set of instructions executable by the processor 235 to provide the acts and/or functionality described below for handling communications between the efficacy application 109 and other components of the computing device 200. In some embodiments, the controller 202 can be stored in the memory 237 of the computing device 200 and can be accessible and executable by the processor 235. The controller 202 may be adapted for cooperation and communication with the processor 235 and other components of the computing device 200.

The controller 202 sends and receives data, via the communication unit 241, to and from one or more of the client device 115, the social network server 130, the server 101, the data server 120 and the mobile computing device 135 depending upon where the efficacy application 109 is stored. For example, the controller 202 receives, via the communication unit 241, social network data (e.g., user social data, item social data) from the social network server 130 and sends the social network data to one or more of the model generator 208 and the score estimator 210. In another example, the controller 202 receives graphical data for providing a user interface to a user from the user interface module 214 and sends the graphical data to the client device 115 or the mobile computing device 135, causing the client device 115 or the mobile computing device 135 to present the user interface to the user.

In some embodiments, the controller 202 receives data from other components of the efficacy application 109 and stores the data in the storage device 245. For example, the controller 202 receives graphical data from the user interface module 214 and stores the graphical data in the storage device 245. In some embodiments, the controller 202 retrieves data from the storage device 245 and sends the retrieved data to other components of the efficacy application 109. For example, the controller 202 retrieves data describing efficacy scores associated with candidate items from the storage 245 and sends the data to the recommendation module 212.

The identification module 204 can be software including routines for identifying a user. In some embodiments, the identification module 204 can be a set of instructions executable by the processor 235 to provide the acts and/or functionality described below for identifying a user. In some embodiments, the identification module 204 can be stored in the memory 237 of the computing device 200 and can be accessible and executable by the processor 235. The identification module 204 may be adapted for cooperation and communication with the processor 235 and other components of the computing device 200.

In some embodiments, the identification module 204 receives identification input data associated with a user from one or more first sensors 140 and/or one or more second sensors 160. For example, the user inputs a fingerprint to a fingerprint reader coupled to the mobile computing device 135, causing the fingerprint reader to send the user's fingerprint to the identification module 204. Example identification input data includes, but is not limited to, a user name and a password, a fingerprint, other identification data provided by a device that is a proxy for the user (e.g., a card, a handheld device, a vehicle registered under the title of the user), identification data based on facial recognition and other biometric data (e.g., voice, retina, etc.), etc.

The identification module 204 retrieves historical identification data associated with the user from the storage device 245 and/or the storage device 145. The identification module 204 determines whether the identification input data matches the historical identification data. For example, the identification module 204 determines whether a fingerprint inputted by the user matches a historical fingerprint of the user stored in the storage 245. If the identification input data matches the historical identification data, the identification module 204 determines that the user is verified and confirms a user identifier (ID) identifying the user. The identification module 204 sends the user ID to other components of the efficacy application 109 so that the other components of the efficacy application 109 can retrieve data associated with the user using the user ID. If the identification input data does not match the historical identification data, the identification module 204 determines that the verification of the user fails.

In some embodiments, the identification module 204 sends the user ID to other components of the efficacy application 109. In additional embodiments, the identification module 204 stores the user ID in the storage 245 and/or the storage 145.

The consumption module 206 can be software including routines for identifying items consumed by a user. In some embodiments, the consumption module 206 can be a set of instructions executable by the processor 235 to provide the acts and/or functionality described below for identifying items consumed by a user. In some embodiments, the consumption module 206 can be stored in the memory 237 of the computing device 200 and can be accessible and executable by the processor 235. The consumption module 206 may be adapted for cooperation and communication with the processor 235 and other components of the computing device 200.

In some embodiments, the consumption module 206 receives a user ID identifying a user from the identification module 204. The consumption module 206 retrieves a consumption history associated with the user from the storage 245 and/or the storage 145 using the user ID. A consumption history associated with a user includes data describing items consumed by the user. For example, a user's consumption history describes songs played by the user, videos viewed by the user, radio programs listened to by the user, places visited by the user in the past, trips taken by the user and people that the user has interacted with (e.g., people called by the user). The consumption module 206 receives sensor data from one or more first sensors 140 and/or one or more second sensors 160 and identifies items consumed by the user based on the sensor data and/or the user's consumption history.

In some examples, the consumption module 206 receives sensor data from one or more first sensors 140 and/or one or more second sensors 160, and estimates a place currently visited by the user based on the sensor data and the user's consumption history including one or more places visited by the user in the past. For example, the consumption module 206 receives data describing a current location and the time of the day from a GPS installed in the user's vehicle. The consumption module 206 also receives data describing engine off from a first sensor 140 that monitors the engine of the user's vehicle, indicating the vehicle driven by the user stops at the current location. The consumption module 206 retrieves data describing a map associated with the current location from the data server 120 and determines one or more candidate places close by the current location. The consumption module 206 estimates a place currently visited by the user as a candidate place visited by the user in the past based on the time of the day, the time duration that the vehicle stops at the current location and/or a walkable distance from the current location. For example, the consumption module 206 estimates a place currently visited by the user as a restaurant that the user has visited in the past since the time of the day is 7:10 PM. Example processes to estimate a place currently visited by a user are illustrated below in more detail with reference to FIG. 13. The place currently visited by the user is an example of an item consumed by the user.

In some examples, the consumption module 206 tracks items played in an in-vehicle infotainment system using a speaker actuator and/or tracks items played in the client device 115. For example, the consumption module 206 tracks songs played on a radio station or songs played by the client device 115 that is connected to the mobile computing device 135 via a cable or a wireless connection (e.g., BLUETOOTH®). The consumption module 206 identifies the songs as example items consumed by the user.

The consumption module 206 determines item IDs identifying the items consumed by the user, and updates the user's consumption history using the consumed items.

For example, the consumption module 206 determines song IDs identifying songs played by the user, place IDs identifying places visited by the user and contact IDs identifying people that interacts with the user, and adds the song IDs, the place IDs and the contact IDs to the user's consumption history. In some embodiments, the consumption module 206 sends the item IDs to other components of the efficacy application 109. In additional embodiments, the consumption module 206 stores the item IDs in the storage 245 and/or the storage 145.

The affinity state module 207 can be software including routines for determining an affinity state for an item consumed by a user. In some embodiments, the affinity state module 207 can be a set of instructions executable by the processor 235 to provide the acts and/or functionality described below for determining an affinity state for an item consumed by a user. In some embodiments, the affinity state module 207 can be stored in the memory 237 of the computing device 200 and can be accessible and executable by the processor 235. The affinity state module 207 may be adapted for cooperation and communication with the processor 235 and other components of the computing device 200.

An affinity state can be data indicating a degree of user affinity to an item. For example, an affinity state associated with an item indicates a user likes the item, dislikes the item or has no affinity with the item. In another example, an affinity state associated with an item indicates a user rates the item with 5 stars with an affinity scale from 1 star to 5 stars. In some embodiments, an affinity state has a discrete value. For example, if a user rates an item with 4 out of 5 stars, an affinity state for the item has a value of ⅘. In some embodiments, different affinity states are associated with different values in an affinity scale, indicating different degrees of user affinity. For example, an affinity state having 5 stars indicates a higher user affinity than an affinity state having 4 stars. Example affinity scales include, but are not limited to, a scale of like/dislike/no affinity, a scale of star ratings (e.g., from 1 star to 5 stars), a scale represented by discrete states of a 16-bit computer register, a scale from 0 point to 100 points, or any other discretized representation of affinity.

Figure 14:
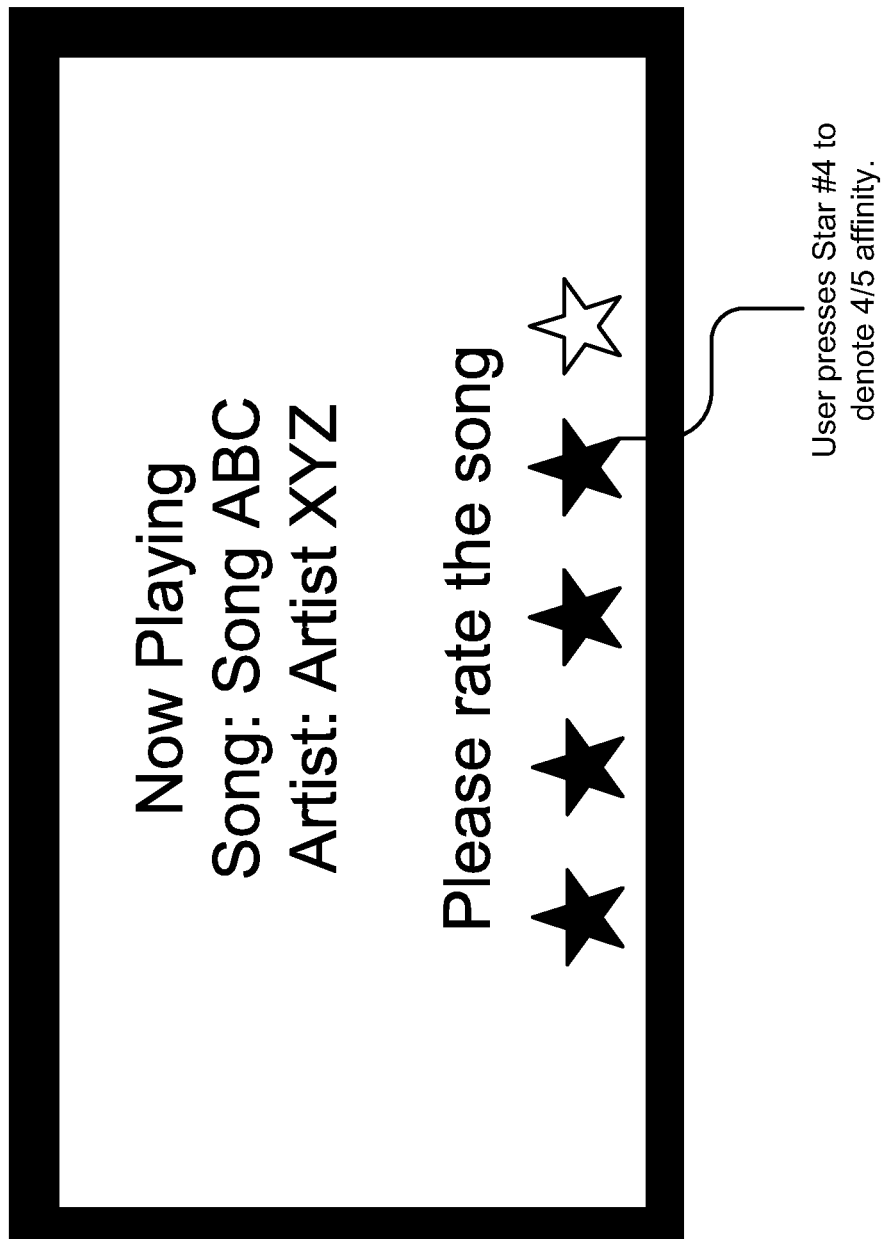
FIG. 14 is a graphic representation illustrating an example user interface that allows a user to input an affinity state for an item.

In some embodiments, the affinity state module 207 receives a user ID identifying a user from the identification module 204 and an item ID identifying an item consumed by the user from the consumption module 206. The affinity state module 207 retrieves data describing an affinity scale for the consumed item from the storage 245. The affinity state module 207 presents the affinity scale associated with the consumed item to the user and requests the user to input an affinity state for the consumed item. In some embodiments, the affinity state module 207 instructs the user interface module 214 to generate graphical data for providing a user interface to the user in the mobile computing device 135 or the client device 115, allowing the user to input an affinity state for the consumed item via the user interface. For example, the user can press 5 stars or a liked button for the consumed item via a touch screen in an in-vehicle head unit. An example user interface is illustrated in FIG. 14. In some embodiments, the user can input the affinity state for the consumed item by interacting with reading sensors (e.g., hardware buttons on the steering wheel or hardware buttons in the in-vehicle head unit). For example, the user can press a hardware button 4 times in the steering wheel to indicate a selection of 4 stars for the consumed item.

The affinity state module 207 determines an affinity state for the consumed item based on the data inputted by the user. For example, the affinity state module 207 determines an affinity state for the consumed item as a liked item if the user selects a "liked" button in a user interface shown in a touch screen. In some embodiments, the affinity state module 207 sends data describing the affinity state associated with the consumed item to one or more of the model generator 208 and the score estimator 210. In additional embodiments, the affinity state module 207 stores the data describing the affinity state in the storage 245 and/or the storage 145.

The model generator 208 can be software including routines for generating a user efficacy model associated with a user. In some embodiments, the model generator 208 can be a set of instructions executable by the processor 235 to provide the acts and/or functionality described below for generating a user efficacy model associated with a user. In some embodiments, the model generator 208 can be stored in the memory 237 of the computing device 200 and can be accessible and executable by the processor 235. The model generator 208 may be adapted for cooperation and communication with the processor 235 and other components of the computing device 200.

A user efficacy model associated with a user can be a model used to generate an efficacy score associated with an item. An efficacy score associated with an item is data indicating a degree of efficacy associated with the item. For example, a high efficacy score associated with an item may indicate that the item is or would be effective, desirable, and/or relevant to a user based on one or more considerations such as usability, legality, personalization, financial consideration and/or other considerations. For example, an efficacious recommendation item may not necessarily be an item that a user wants, but can be an item that a user needs based on one or more requirements such as usability, legality, personalization, financial consideration and/or other considerations. In some embodiments, an efficacy score associated with an item is a discrete numeric score indicating a degree of efficacy that the recommendation of the item may produce. An efficacy includes, for example, a degree of satisfaction of one or more requirements such as usability, legality, personalization, financial consideration and/or other considerations. The model generator 208 and the user efficacy model are described below in more detail with reference to FIGS. 3A and 3B.

The score estimator 210 can be software including routines for generating efficacy scores for items. In some embodiments, the score estimator 210 can be a set of instructions executable by the processor 235 to provide the acts and/or functionality described below for generating efficacy scores for items. In some embodiments, the score estimator 210 can be stored in the memory 237 of the computing device 200 and can be accessible and executable by the processor 235. The score estimator 210 may be adapted for cooperation and communication with the processor 235 and other components of the computing device 200.

In some embodiments, the score estimator 210 generates an efficacy score for an item and sends the efficacy score to the recommendation module 212. In additional embodiments, the score estimator 210 stores the efficacy score in the storage 245 and/or the storage 145. The efficacy score and the score estimator 210 are described below in more detail with reference to FIGS. 4A and 4B.

The recommendation module 212 can be software including routines for providing recommendation items to users. In some embodiments, the recommendation module 212 can be a set of instructions executable by the processor 235 to provide the acts and/or functionality described below for providing recommendation items to users. In some embodiments, the recommendation module 212 can be stored in the memory 237 of the computing device 200 and can be accessible and executable by the processor 235. The recommendation module 212 may be adapted for cooperation and communication with the processor 235 and other components of the computing device 200.

In some embodiments, the recommendation module 212 receives a set of candidate items from the data server 120, the server 101 and/or the social network server 130. Example candidate items include, but are not limited to, restaurants, hotels, points of interest, radio programs, audio files (e.g., songs, podcasts), videos, radio stations and news items, etc. The recommendation module 212 instructs the score estimator 210 to generate an efficacy score for each candidate item. The recommendation module 212 receives a set of efficacy scores associated with the set of candidate items from the score estimator 210. The recommendation module 212 ranks the set of candidate items based on the set of efficacy scores. The recommendation module 212 generates one or more recommendation items as one or more candidate items having the highest rankings from the set of candidate items.

In additional embodiments, the recommendation module 212 retrieves stakeholder efficacy data from the stakeholder efficacy database 247. The recommendation module 212 eliminates one or more candidate items from the set of candidate items based on the stakeholder efficacy data. For example, if the user is 18 years old, the recommendation module 212 removes bar recommendations from the set of candidate items because the stakeholder efficacy data indicates not to recommend bars to users less than 21 years old. In another example, if the user is merging lanes on a highway, the recommendation module 212 suspends the recommendation of audio items to the user because the stakeholder efficacy data indicates not to recommend audio items to users when the users are merging lanes on highways. The recommendation module 212 ranks the remaining candidate items based on the corresponding efficacy scores, and generates one or more recommendation items from the ranked remaining candidate items. For example, the recommendation module 212 generates one or more recommendation items as one or more remaining candidate items having highest rankings.

In some examples, the user efficacy model indicates the user usually listens to a certain type of audio items (e.g., music or radio programs) at a certain time of the day or during a certain trip, and the recommendation module 212 generates recommendation items for the user that include the certain type of audio items at the certain time of the day or during the certain trip. For example, the user efficacy model indicates the user usually listens to news while commuting from home to work, and the recommendation module 212 recommends a news radio to the user when the user is driving from home to work. In some examples, the user efficacy model indicates a user usually picks up a kid from school between 3:00 PM and 3:30 PM every weekday, and the recommendation module 212 downloads and stores the kid's favorite cartoons before 3:00 PM every weekday in the mobile computing device 135 so that the favorite cartoons are available for the kid to watch on the way home from school. In some examples, the user efficacy model indicates the user usually calls a certain contact at a certain time of the day or during a certain trip, and the recommendation module 212 presents the phone number of the contact to the user at the certain time of the day or during the certain trip so that the user can access the phone number and call the contact easily.

The recommendation module 212 provides the one or more recommendation items to the user. For example, the recommendation module 212 instructs the user interface module 214 to generate graphical data for providing a user interface that presents the one or more recommendation items to the user. In another example, the recommendation module 212 delivers one or more audio recommendation items to the mobile computing device 135 or the client device 115, causing a speaker system coupled to the mobile computing device 135 or the client device 115 to play the one or more audio recommendation items to the user. In some embodiments, the recommendation module 212 stores the one or more recommendation items in the storage 245 and/or the storage 145.

The user interface module 214 can be software including routines for generating graphical data for providing user interfaces to users. In some embodiments, the user interface module 214 can be a set of instructions executable by the processor 235 to provide the acts and/or functionality described below for generating graphical data for providing user interfaces to users. In some embodiments, the user interface module 214 can be stored in the memory 237 of the computing device 200 and can be accessible and executable by the processor 235. The user interface module 214 may be adapted for cooperation and communication with the processor 235 and other components of the computing device 200.

In some embodiments, the user interface module 214 generates graphical data for providing a user interface that presents one or more recommendation items to a user. The user interface module 214 sends the graphical data to a client device 115 and/or a mobile computing device 135, causing the client device 115 and/or the mobile computing device 135 to present the user interface to the user. In some embodiments, the user interface module 214 generates graphical data for providing a user interface that allows a user to input an affinity state for an item. An example user interface is illustrated with reference to FIG. 14. In some embodiments, the user interface module 214 generates graphical data for providing a user interface that allows a stakeholder to input stakeholder efficacy data. The user interface module 214 may generate graphical data for providing other user interfaces to users.

An example use of the efficacy application 109 includes providing in-vehicle content recommendations to a user. For example, a user (e.g., a driver or a passenger) in a vehicle can request the efficacy application 109 to provide recommendation items that include, but are not limited to, places (e.g., restaurants, gas stations, hotels), routes to different destinations, audio items and a contact that the user wants to communicate with based on a speech command, etc. The efficacy application 109 determines the recommendation items for the user based at least in part on a user efficacy model associated with the user so that the content recommendation for the user is efficacious. For example, the content recommendation satisfies one or more efficacy requirements including legality, safety, mobility, situational requirements, financial requirements and other requirements configured by a stakeholder.

Example Model Generator

Figure 3A:
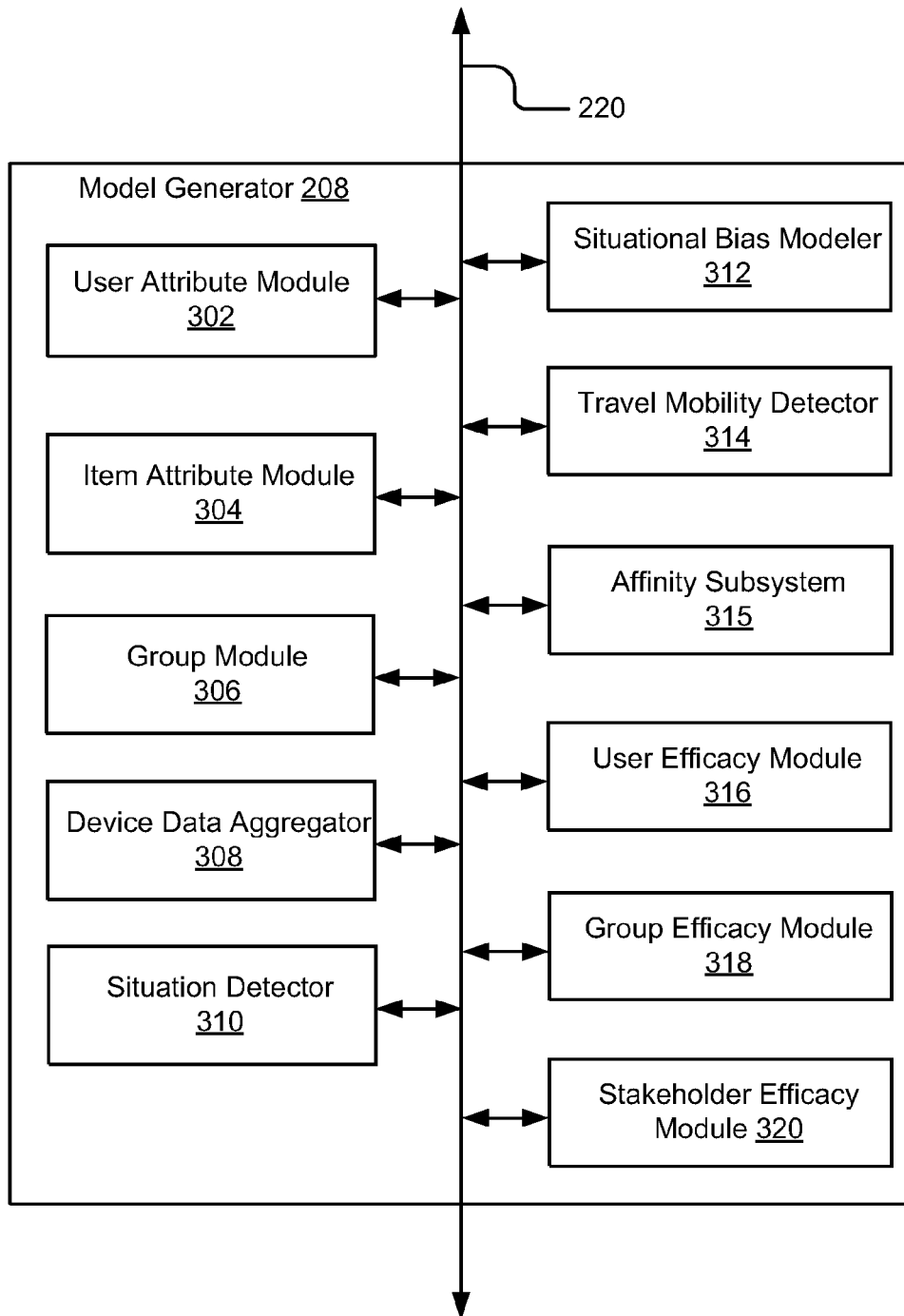
FIGS. 3A and 3B are block diagrams illustrating examples of a model generator.

Referring now to FIG. 3A, an example of the model generator 208 is shown in more detail. The example model generator 208 includes a user attribute module 302, an item attribute module 304, a group module 306, a device data aggregator 308, a situation detector 310, a situational bias modeler 312, a travel mobility detector 314, an affinity subsystem 315, a user efficacy module 316, a group efficacy module 318 and a stakeholder efficacy module 320. The components of the model generator 208 are communicatively coupled to each other via the bus 220.

The user attribute module 302 can be code and routines for aggregating data associated with a user to generate user attribute data. In some embodiments, the user attribute module 302 receives a user ID identifying a user from the identification module 204. In some embodiments, the user attribute module 302 receives data describing a user profile associated with the user from the social network server 130 using the user ID. In some embodiments, the user attribute module 302 retrieves data describing the user profile from the storage 245 and/or the storage 145. In some examples, a user profile associated with a user includes interests, hobbies, education background, working experience, demographic information, communities joined by the user and topics subscribed by the user, etc. The user profile may include other data associated with the user.

The user attribute module 204 may retrieve user social data associated with the user from the social network server 130. User social data can be data describing one or more social activities performed by a user in a social network. For example, the user social data describes one or more of places checked in by the user in the social network, posts published by the user, comments published by the user, sharings performed by the user, endorsements performed by the user, topics subscribed by the user and communities followed by the user, etc. Other example user social data is possible.

In some embodiments, the user attribute module 302 generates user attribute data for the user based on one or more of the user profile and the user social data. User attribute data associated with a user can be data representing one or more attributes that describe the user. For example, the user attribute data includes one or more attributes describing the user and corresponding values for the one or more attributes. Example attributes that describe a user include, but are not limited to, a city where the user lives, a job title, a college where the user attends or graduated from, interests, gender, age, hobbies, topic and/or community subscriptions, etc. Other example attributes associated with the user are possible. Example values for attributes include, but are not limited, a zero value, a non-zero numeral value, a description, a link (e.g., a uniform resource locator (URL)) and a symbol, etc. Other example values are possible.

For example, the user attribute data includes a first attribute "interest: technology" with a value of "1" and a second attribute "interest: poem" with a value of "0," indicating the user likes technology and does not like poems. In another example, the user attribute data includes a first attribute "topic: science fiction" with a value of 8 associated with an affinity scale from 1 to 10 and a second attribute "topic: romantic novels" with a value of 5, indicating the user likes science fiction more than romantic novels. In yet another example, the user attribute data includes a first attribute "location" with a value of "San Francisco" and a second attribute "education" with a value of "XYZ University" and a link to the XYZ University. Other example user attribute data is possible.

Figure 4A:
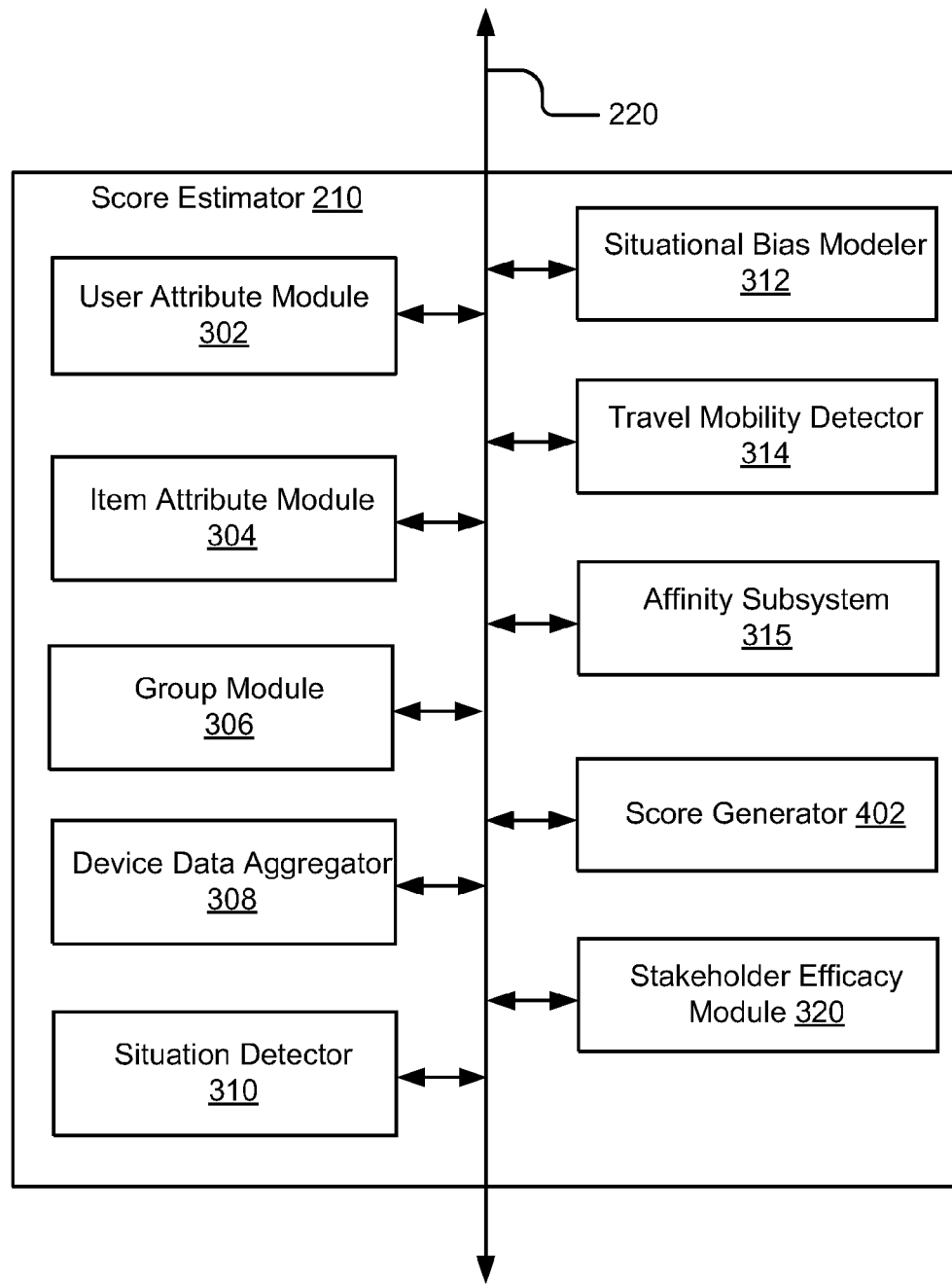
FIGS. 4A and 4B are block diagrams illustrating examples of a score estimator.
Figure 4B:
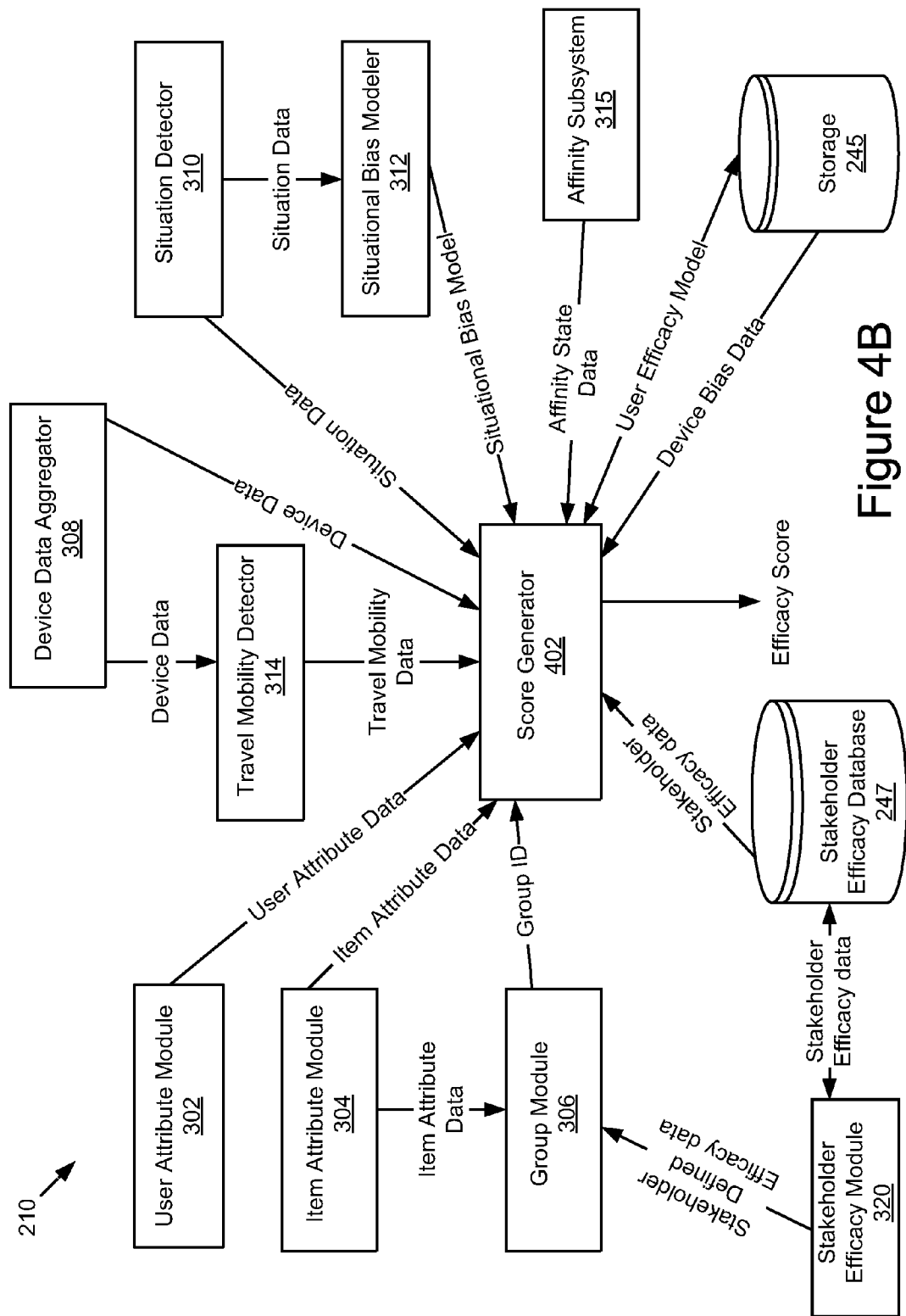

In some embodiments, the user attribute module 302 sends the user attribute data to the user efficacy module 316 and a score generator 402 which is illustrated in FIGS. 4A and 4B. In additional embodiments, the user attribute module 302 stores the user attribute data in the storage 245 and/or the storage 145.

The item attribute module 304 can be code and routines for aggregating data associated with an item to generate item attribute data. In some embodiments, the item attribute module 304 receives an item ID identifying an item from the consumption module 206 and data describing an affinity state associated with the item from the affinity state module 207. The item attribute module 304 retrieves item data describing the item from the storage 245 and/or the storage 145. For example, the item attribute module 304 retrieves structured item data from the storage device 245 that stores the item.

In some embodiments, the item attribute module 304 receives item social data associated with the item from the social network server 130. Item social data associated with an item can be data describing one or more social activities performed in a social network that are related to the item. For example, the item social data describes one or more of a popularity of the item in the social network (e.g., a total number of views, comments, reposts and/or sharings associated with the item), whether the item is a trending item, whether the item is in a top list, whether the item is a red-hot item and/or whether the item is published by a famous publisher, etc. Other example item social data is possible.

In some embodiments, the item attribute module 304 generates item attribute data for the item based on one or more of the affinity state, the item social data and the item data. Item attribute data associated with an item can be data representing one or more attributes that describe the item. For example, the item attribute data includes an affinity state of the item. In some embodiments, the item attribute data includes one or more attributes describing the item and corresponding values for the one or more attributes. For example, attributes associated with an item include a title, an author, a publisher, an address to retrieve the item, a total number of views, comments, reposts and/or sharings of the item in the social network, etc. In another example, attributes associated with an item include a name of the item (e.g., a hotel name), a location associated with the item (e.g., a hotel address), user ratings and comments associated with the item. In yet another example, attributes associated with an item include a contact name, a relationship between the contact and the user, a phone number and an email address of the contact, etc. Other example attributes associated with an item are possible. Example values for the attributes include, but are not limited to, a zero value, a non-zero numeric value, a description, a link (e.g., a uniform resource locator (URL)) and a symbol, etc. Other example values are possible.

For example, the item attribute data that describes a news item includes a first attribute "an author" with a value of "Mary ABC," a second attribute "a total number of views" with a value of "1,234" and a third attribute "category" with a value of "news item." In another example, the item attribute data that describes a hotel visited by the user includes a first attribute "hotel name" with a value of "Hotel XYZ," a second attribute "check-in date" with a value of "Apr. 01, 2013," a third attribute "check-out date" with a value of "Apr. 05, 2013" and a fourth attribute "user rating" with a value of "5 stars." In yet another example, the item attribute data that describes a song includes a first attribute "artist" with a value of "Kelly DEF," a second attribute "a total of number of times that the user plays the song" with a value of "10" and a third attribute "the last time when the song was played" with a value of "yesterday." Other example item attribute data is possible.

In some embodiments, the item attribute module 304 sends the item attribute data to the user efficacy module 316 and the score generator 402. In additional embodiments, the item attribute module 304 stores the item attribute data in the storage 245 and/or the storage 145.

Figure 15:
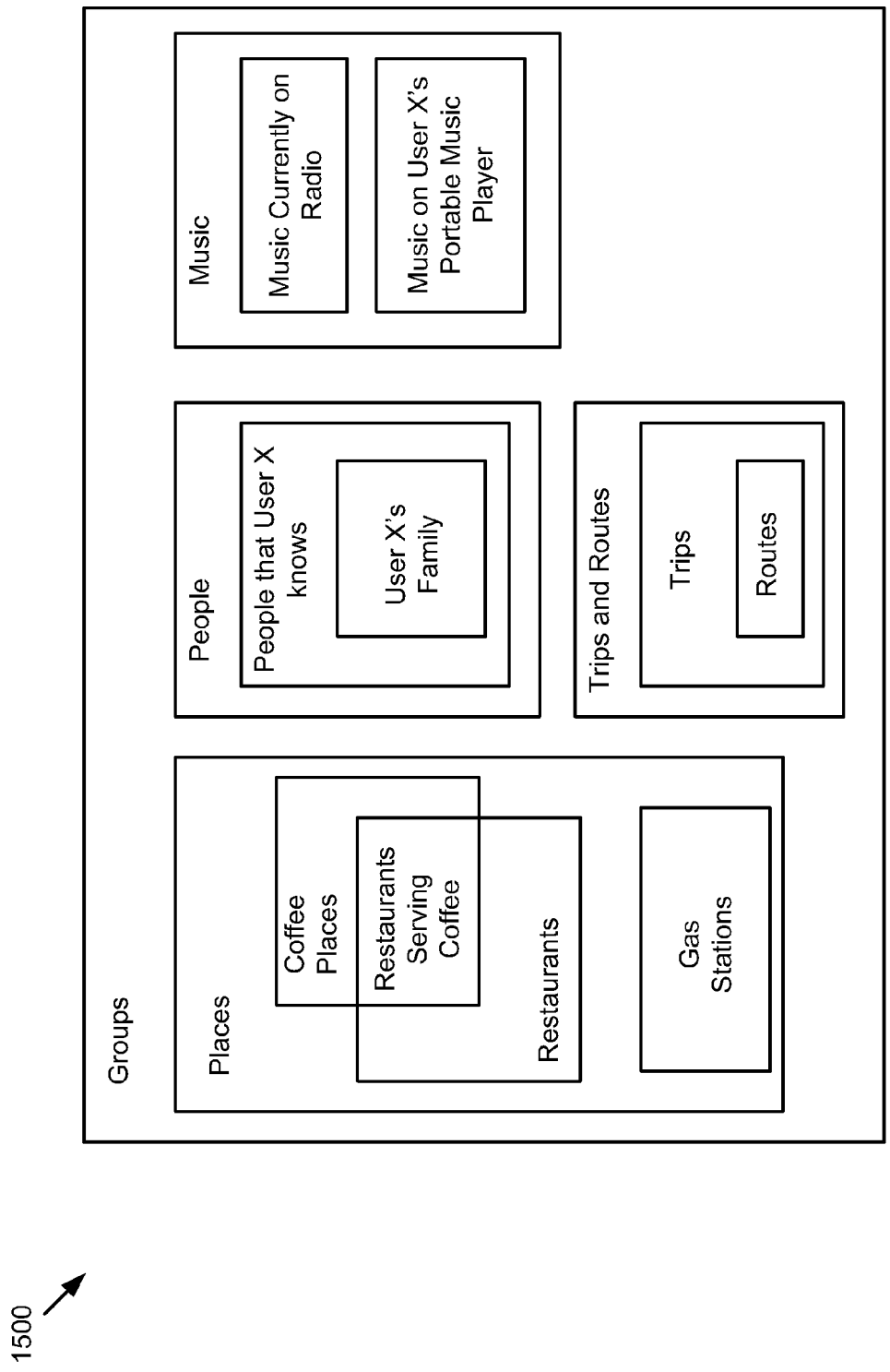
FIG. 15 is a graphic representation illustrating example groups.

The group module 306 can be code and routines for classifying an item into one or more groups. In some embodiments, the group module 306 receives item attribute data associated with an item from the item attribute module 304. The group module 306 classifies the item into one or more groups based on the item attribute data. For example, the group module 306 classifies a restaurant with a bar into a group of places, a sub-group of restaurants and a sub-group of bars that serve alcohol drinks to adults over 21 years old. A group of items can be data describing a collection of items that share one or more similar attributes. Example groups include, but are not limited to, a group of places including a sub-group of gas stations and a sub-group of restaurants, a group of people including a sub-group of friends and a sub-group of family members, a group of trips and routes, a group of music files, a group of videos and a group of news items, etc. More example groups of items are illustrated in FIG. 15.

The group module 306 determines one or more group IDs identifying the one or more groups and associates the one or more group IDs with the item. The identification of one or more groups associated with an item is advantageous since, for example, an efficacy produced by recommendation items from a first group may be different from an efficacy produced by recommendation items from a second group. For example, an efficacy for a place recommended to a user is different from an efficacy for a song recommended to the user.

In some embodiments, the group module 306 sends the one or more group IDs that identify the one or more groups associated with the item to the user efficacy module 316, the group efficacy module 318 and/or the score generator 402. In additional embodiments, the group module 306 stores the one or more group IDs and associations between the one or more group IDs and the item in the storage 245 and/or the storage 145.

The device data aggregator 308 can be code and routines for aggregating device data associated with the mobile computing device 135. Device data can be data describing the mobile computing device 135. In some embodiments, the device data includes a device type, a device model, sensor data received from first sensors 140 that are coupled to the mobile computing device 135 and remote device data retrieved from the data server 120 via the network 105. For example, if the mobile computing device 135 is a vehicle, the device data may include vehicle data including a vehicle type (e.g., gasoline, electric, hybrid), a vehicle model, sensor data from the vehicle (e.g., current gas mileage or other data from a camera, a GPS or an OBD system), data stored in the storage device 245 (e.g., local vehicle data including a vehicle ID) and data retrieved from the data server 120 (e.g., remote vehicle data including vehicle updates stored in the data server 120). In some embodiments, the device data may include other data associated with the mobile computing device 135.

In some embodiments, the device data aggregator 308 retrieves one or more of sensor data associated with the mobile computing device 135 from one or more first sensors 140, local data (e.g., local vehicle data) from the storage 245 and/or remote data (e.g., remote vehicle data) from the storage 145 in the data server 120 via the network 105. The device data aggregator 308 aggregates the retrieved data as the device data associated with the mobile computing device 135. In some embodiments, the device data aggregator 308 stores the aggregated device data in the storage 245. In additional embodiments, the device data aggregator 308 sends the device data to the travel mobility detector 314 and the score generator 402.

The situation detector 310 can be code and routines for generating situation data describing a situation associated with a user. Example situations include, but are not limited to, driving a kid to school, picking up a kid from school, commuting to work, shopping for groceries, traveling to a vacation spot, traveling to a gas station and traveling to airport, etc. Other example situations are possible.

In some embodiments, the situation detector 310 receives a user ID identifying a user from the identification module 204. The situation detector 310 retrieves data describing a user request history associated with the user from the storage 245 using the user ID. The user request history can be data describing one or more historical requests made by the user in the past. For example, the user request history includes data describing one or more destinations, one or more hotels, one or more songs, one or more restaurants, etc., requested by the user. In some examples, the user request history may also include other data requested by the user.

In some embodiments, the situation detector 310 retrieves data describing a user situation history associated with the user from the storage 245 and/or the storage 145. A user situation history can be data describing historical situations, such as trips the user has taken, locations the user has mapped, driving activities, social activities, and entertainment activities (e.g., music listened to) that the user has engaged in in the past, etc. For example, the user situation history describes that the user takes trips to purchase groceries every week. In another example, the user situation history describes that the user takes trips to drop off and pick up a kid at school every weekday. The situation detector 310 also receives sensor data from first sensors 140 and/or second sensors 160. For example, the situation detector 310 receives data describing the time of the day and the user's current location from a GPS. The situation detector 310 retrieves map data describing a map associated with the user's current location from the data server 120.

The situation detector 310 determines a current situation associated with the user based on one or more of the user request history, the user situation history, the sensor data and the map data. A current situation may describe an activity being performed by the user, such as a driving activity, an entertainment activity, a social activity, a consumption activity, etc. For example, assume the time of the day is 7:40 AM and the user's current location indicates the user is on a highway heading towards the working location. If the user situation history indicates that the user usually drives to work between 7:30 AM and 8:30 AM, the situation detector 310 determines a current situation associated with the user as commuting to work. In another example, if the user request history indicates the user requested for driving directions to an airport 2 minutes ago and the user is currently driving towards a highway that connects to the airport, the situation detector 310 determines a current situation associated with the user as traveling to the airport.

In some embodiments, an administrator of the computing device 200 or the user inputs one or more predefined situations for the user. The predefined situations are described by predefined situation data and the associated parameters (e.g., the time of the day, the day of the week, the current location, the travel direction, etc.). For example, the administrator or the user configures a list of predefined situations based on the time of the day so that a predefined situation for the time period 8:00 AM-9:00 AM is commuting to work, a predefined situation for the time period 3:00 PM-4:00 PM is picking up a kid from school and a predefined situation for the time period 6:00 PM-7:00 PM is picking up dinner from a restaurant on the way home from work, etc. In additional embodiments, the situation detector 310 determines one or more predefined situations for the user based on one or more of the user situation history and the user request history. For example, the situation detector 310 aggregates the user's historical situations retrieved from the user situation history and generates a list of predefined situations as one or more situations from the user's historical situations.

The situation detector 310 receives sensor data (e.g., the time of the day, the user's current location, the travel direction, etc.) from one or more first sensors 140 and/or one or more second sensors 160. Based on the sensor data, the situation detector 310 determines a current situation for the user from the list of predefined situations so that the current situation is a predefined situation matching the sensor data. For example, if the time of the day is 8:00 AM, the situation detector 310 determines a current situation (e.g., commuting to work) from the list of predefined situations that matches the time of the day.

In some embodiments, the situation detector 310 updates the user situation history using the user's current situation. For example, the situation detector 310 adds the current situation to the user situation history. In some embodiments, the situation detector 310 sends the situation data describing the current situation to one or more of the situational bias modeler 312, the affinity subsystem 315, the user efficacy module 316 and the score generator 402. In additional embodiments, the situation detector 310 stores the situation data in the storage 245 and/or the storage 145.

The situational bias modeler 312 can be code and routines for generating a situational bias model for a situation associated with a user. A situational bias model can be data describing one or more situational constraints to be satisfied in a situation in order to achieve desired efficacy. Example situational constraints include, but are not limited to, a time-to-destination constraint, a shortest-distance constraint, a lowest-price constraint, a fastest-route constraint, a safety constraint, a legality constraint, a financial constraint or any other situational constraint configured by a user, etc. Different situations may have different situational constraints.

For example, for a situation "dropping kids to school," a situational bias model may include a time-to-destination constraint; however, for a situation "shopping for groceries," the situational bias model may not include a time-to-destination constraint but include a shortest-distance constraint. In another example, if a current situation indicates a user is searching for a restaurant with dinner options, the situational bias modeler 312 may generate a situational bias model for the current situation to include a time-to-destination constraint, so that a restaurant with a fixed closing time needs to satisfy the time-to-destination constraint from the user's current location in order to be recommended to the user.

In some embodiments, the situational bias modeler 312 receives situation data describing a current situation from the situation detector 310. The situational bias modeler 312 retrieves data describing one or more standard situational bias models from the storage 245 and/or the storage 145. A standard situational bias model can be a situational bias model with predetermined configurations. For example, configurations for a standard situational bias model that includes one or more situational constraints are stored in the storage 145 and/or the storage 245. The situational bias modeler 312 generates a situational bias model for the current situation based on the one or more standard situational bias models. For example, the situational bias modeler 312 determines a situational bias model for the current situation as a standard situational bias model that matches the current situation. In another example, the situational bias modeler 312 selects a standard situational bias model that has a related situation closest to the current situation, and generates a situational bias model for the current situation by adjusting configurations (e.g., situational constraints) of the selected standard situational bias model according to the current situation.

In some embodiments, the situational bias modeler 312 receives configuration data describing one or more constraints for a situational bias model from a user and/or a stakeholder, and generates a situational bias model based at least in part on the received configuration data. In some embodiments, the situational bias modeler 312 records data describing user interactions with one or more recommendation items, and generates a situational bias model for the user based on the user interactions. For example, the situational bias modeler 312 learns from the user interaction data that the user rejects or ignores a certain type of suggestions and/or selects a certain type of recommendation items in a certain situation. The situational bias modeler 312 can generate the situational bias model for the user based on the behavior described in the user interaction data.

In some embodiments, the situational bias modeler 312 sends the situational bias model to the user efficacy module 316 and the score generator 402. In additional embodiments, the situational bias modeler 312 stores the situational bias model in the storage 145 and/or the storage 245.

The travel mobility detector 314 can be code and routines for generating travel mobility data associated with a user. Travel mobility data can be data describing one or more trips taken by a user. Example travel mobility data includes, but is not limited to, a planned route for a trip, an optimal route for a trip, a trip offset distance (e.g., a distance of a trip stop-off point away from a planned route), a trip duration, a trip start point, a trip end point, a distance for a trip, a trip stop-off point, a trip start time, a strip end time, a map associated with a route and device data (e.g., vehicle data including a vehicle type, how far the vehicle will travel, etc.) associated with the mobile computing device 135. For example, assume a user's trip history indicates the user usually takes a particular route to commute between home and work. The user sometimes picks up groceries from a grocery store on the way back from work and the grocery store is about 0.2 miles off the particular route. In this example, the travel mobility data associated with the user includes the user's trip history, the route, the trip stop-off point at the grocery store and a trip offset distance of 0.2 miles, etc. The travel mobility data may include other data associated with the user's trips.

In some embodiments, the travel mobility detector 314 receives sensor data from one or more first sensors 140 and/or second sensors 160. For example, the travel mobility detector 314 receives sensor data describing one or more of engine on in a vehicle, engine off in the vehicle, parking break in the vehicle, a travel speed, a current location and the time of the day from the first sensors 140 and/or the second sensors 160. The travel mobility detector 314 determines a trip start point, a trip stop-off point and/or a trip end point based on the sensor data. For example, the travel mobility detector 314 determines a trip start point as a location where the engine of the vehicle is on, a trip end point as a location where the engine of the vehicle is off and a trip stop-off point as a location where the travel speed is zero and the parking break occurs.

In some embodiments, the travel mobility detector 314 retrieves one or more similar historical trips taken by the user from the trip start point to the trip end point from the user's trip history stored in the storage 145 and/or the storage 245. The travel mobility detector 314 determines a trip offset distance by comparing the current trip with the one or more similar historical trips. For example, assume the user travels to a trip stop-off point (e.g., a drive-through dry clean store) during a trip from work to home and the trip stop-off point is 0.5 miles away from the historical route from work to home. The travel mobility detector 314 determines a trip offset distance as 0.5 miles off the historical route.

In some embodiments, the travel mobility detector 314 retrieves map data describing a map associated with a current trip taken by the user. The travel mobility detector 314 receives device data associated with the mobile computing device 135 from the device data aggregator 308. The travel mobility detector 314 generates travel mobility data that includes one or more of the trip start point, the trip stop-off point, the trip end point, the trip offset distance, the map data and the device data. In some embodiments, the travel mobility detector 314 sends the travel mobility data to the user efficacy module 316 and the score generator 402. In additional embodiments, the travel mobility detector 314 stores the travel mobility data in the storage 145 and/or the storage 245.

The affinity subsystem 315 can be code and routines for predicting an affinity state for an item. For example, the affinity subsystem 315 predicts an affinity state for a candidate item and sends the affinity state for the candidate item to the score generator 402. In some embodiments, the affinity subsystem 315 receives a user ID identifying a user from the identification module 204, an item ID identifying a candidate item, data describing one or more user preferences associated with the user from the storage 145 and/or the storage 245 and data describing a current situation from the situation detector 310. The affinity subsystem 315 retrieves data describing a consumption history associated with the user from the storage 145 and/or the storage 245. The consumption history includes one or more items consumed by the user. The affinity subsystem 315 retrieves data describing historical affinity states of the consumed items and trains the prediction of affinity states for candidate items based on the historical affinity states of the consumed items.

The affinity subsystem 315 predicts an affinity state for the candidate item based on one or more of the user preferences, the current situation, the user's consumption history and the historical affinity states associated with the consumed items. For example, the affinity subsystem 315 estimates an affinity state for a song as a liked item if the user has endorsed similar songs played in the past. In another example, if the current situation indicates the user is on the way to pick up a kid from school, the affinity subsystem 315 estimates a higher affinity state for a new episode of the kid's favorite animation than a news item. In yet another example, the affinity subsystem 315 estimates a higher affinity state for a coffee shop than other coffee shops because the user's consumption history indicates the user visited the coffee shop in the past.

In some embodiments, the affinity subsystem 315 sends the predicted affinity state to the user efficacy module 316 and the score generator 402. In additional embodiments, the affinity subsystem 315 stores the predicted affinity state in the storage 145 and/or the storage 245.

The user efficacy module 316 can be code and routines for generating a user efficacy model for a user. In some embodiments, the user efficacy module 316 receives one or more of stakeholder efficacy data from the stakeholder efficacy module 320, user attribute data associated with the user from the user attribute module 302, item attribute data associated with items consumed by the user from the item attribute module 304, affinity states for the consumed items from the affinity state module 207, group IDs associated with the consumed items from the group module 306, situation data describing a current situation from the situation detector 310, a situational bias model for the current situation from the situational bias modeler 312 and travel mobility data from the travel mobility detector 314.

The user efficacy module 316 determines whether a historical user efficacy model associated with the user exists. If a historical user efficacy model associated with the user does not exist (e.g., there is no user efficacy model generated for the user in the past), the user efficacy module 316 receives data describing a group efficacy model from the group efficacy module 318. In some embodiments, the user efficacy module 316 retrieves a group efficacy model from the group efficacy module 318 based on the user ID and the user profile. For example, if the user is a city dweller, the user efficacy module 316 retrieves a group efficacy model that satisfies a first distance-to-home attribute; however, if the user is a rural dweller, the user efficacy module 316 retrieves a group efficacy model that satisfies a second distance-to-home attribute. In some embodiments, the user efficacy module 316 retrieves the group efficacy model from the group efficacy module 318 based on a group that an item belongs to. For example, the user efficacy module 316 retrieves a group efficacy model that matches the group ID associated with the item. The group efficacy model is described below in more detail.

The user efficacy module 316 generates a user efficacy model for the user based on one or more of the stakeholder efficacy data, the group efficacy model, the user attribute data, the item attribute data including affinity states, the group IDs, the situational bias model and the travel mobility data. For example, the user efficacy module 316 generates a user efficacy model that encodes the stakeholder efficacy data, the group efficacy model, the user attribute data, the item attribute data including affinity states, the group IDs, the situational bias model and the travel mobility data, so that a desired effect (e.g., an efficacy of usability, personalization, legality, financial considerations, etc.) is produced when the user efficacy model is used to generate efficacy scores for candidate items.

For example, the user efficacy module 316 generates a user efficacy model to encode a time-to-destination constraint in the situational bias model, so that the score generator 402 generates higher efficacy scores for candidate places that satisfy the time-to-destination constraint. In another example, the user efficacy module 316 generates a user efficacy model that encodes the stakeholder efficacy data indicating not to provide bar recommendations to users under 21 years old, so that the score generator 402 generates low efficacy scores (e.g., zero efficacy scores) for candidate places that include bars if the user is under 21 years old. In yet another example, the user efficacy module 316 generates a user efficacy model that encodes the trip offset distance included in the travel mobility data, so that the score generator 402 generates higher affinity scores for candidate places that are within the trip offset distance from the current trip and lower affinity scores for candidate places that are not within the trip offset distance from the current trip.

If a historical user efficacy model associated with the user already exists (e.g., a user efficacy model that was generated for the user previously), the user efficacy module 316 retrieves data describing the historical user efficacy model from the storage 145 and/or the storage 245. The user efficacy module 316 generates a user efficacy model for the user based on one or more of the stakeholder efficacy data, the historical user efficacy model, the user attribute data, the item attribute data including affinity states, the group IDs, the situational bias model and the travel mobility data. For example, the user efficacy module 316 updates the historical user efficacy model to generate a new user efficacy model based on one or more of the stakeholder efficacy data, the historical user efficacy model, the user attribute data, the item attribute data including affinity states, the group IDs, the situational bias model and the travel mobility data.

In some embodiments, the user efficacy module 316 sends the user efficacy model to the score generator 402. In additional embodiments, the user efficacy module 316 stores the user efficacy model in the storage 145 and/or the storage 245.

The group efficacy module 318 can be code and routines for generating a group efficacy model. In some embodiments, a group efficacy model can be an efficacy model for a group of items. For example, a first group efficacy model is an efficacy model for a group of hotels and a second group efficacy model is an efficacy model for a group of songs. In another example, a group efficacy model can be a standard efficacy model that encodes bias based on item attributes in a particular group. For example, even if a user likes a particular bar and the bar is open at the time of the day, a standard efficacy model for a group of bars indicates not to recommend the bars to any users under 21 years old. In some embodiments, the group efficacy module 308 determines a standard efficacy model for a group of items and stores the standard efficacy model in the storage 145 and/or the storage 245. For example, the group efficacy module 308 receives stakeholder efficacy data from the stakeholder efficacy module 320 and encodes the stakeholder efficacy data as configurations to achieve a desired effect in the standard efficacy model for a particular group.

In some embodiments, a group efficacy model can be an efficacy model for a group of users. For example, a first group efficacy model is an efficacy model for a group of users below 21 years old and a second group efficacy model is an efficacy model for a group of users at least 21 years old. In another example, a group efficacy model can be an average group efficacy model that is an average of user efficacy models associated with users in the same group. In some embodiments, the group efficacy module 316 compiles a list of user efficacy models associated with the users in the same group and generates an average group efficacy model from the list of user efficacy models. The group efficacy module 318 may update and publish the average group efficacy model periodically. In some examples, the average group efficacy model is updated and published in a server 101.

In some embodiments, the group efficacy module 318 stores the group efficacy model in the storage 145 and/or the storage 245. In additional embodiments, the group efficacy module 318 sends the group efficacy model to the user efficacy module 316.

The stakeholder efficacy module 320 can be code and routines for configuring stakeholder efficacy data. In some embodiments, the stakeholder efficacy module 320 receives stakeholder efficacy data from a stakeholder and stores the stakeholder efficacy data in the stakeholder efficacy database 247. In additional embodiments, the stakeholder efficacy module 320 sends the stakeholder efficacy data to the user efficacy module 316 and the score generator 402.

Figure 3B:
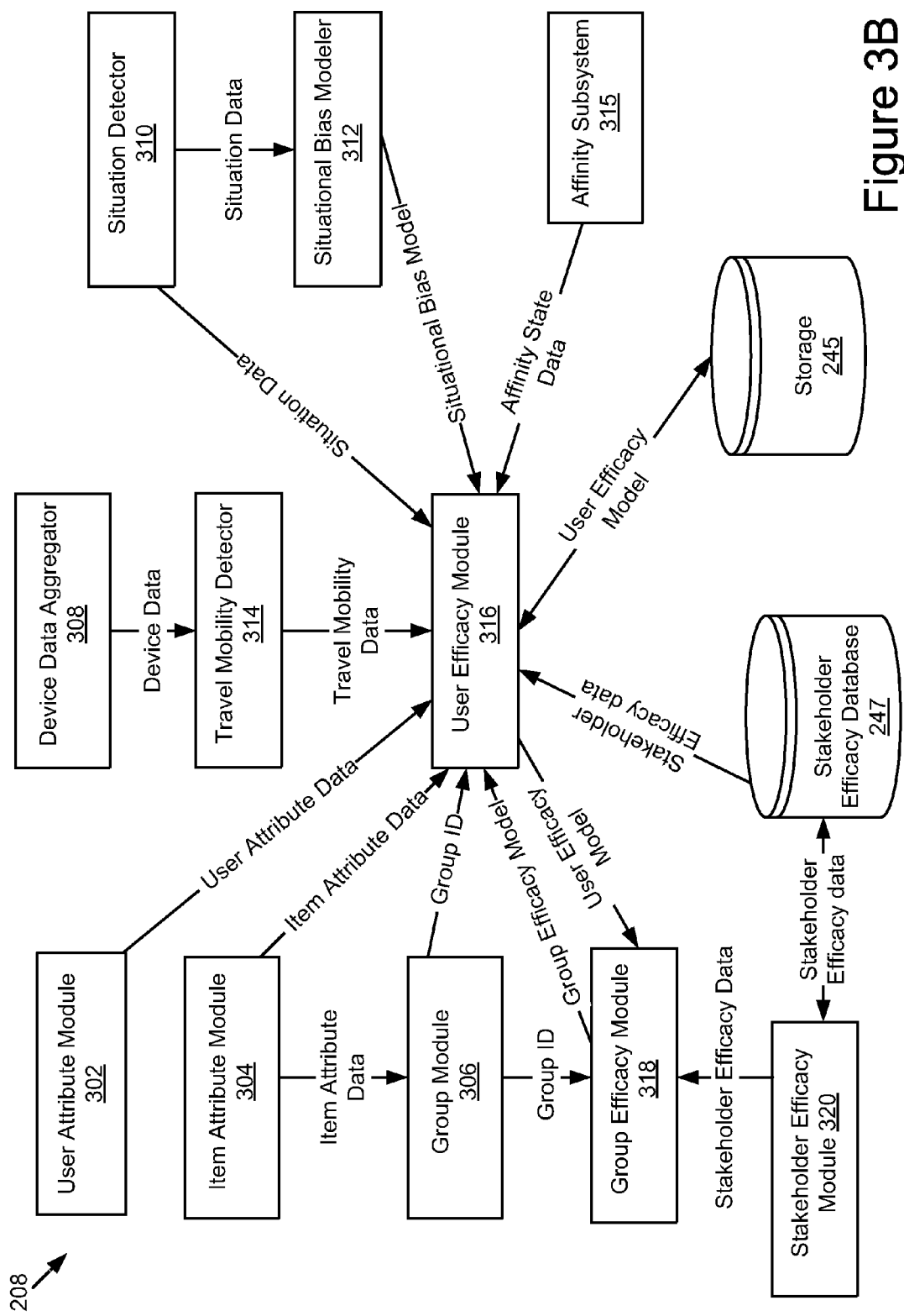

Referring now to FIG. 3B, another example of the model generator 208 is shown in more detail. The user attribute module 302 generates user attribute data associated with a user and sends the user attribute data to the user efficacy module 316. The item attribute module 304 generates item attribute data and sends the item attribute data to the group module 306 and the user efficacy module 316. The group module 306 generates a group ID that an item is associated with and sends the group ID to the group efficacy module 318 and the user efficacy module 316. The stakeholder efficacy module 320 retrieves stakeholder efficacy data from the stakeholder efficacy database 247 and sends the stakeholder efficacy data to the group efficacy module 318. The group efficacy module 318 generates a group efficacy model based on the group ID and the stakeholder efficacy data, and sends the group efficacy model to the user efficacy module 316.

The device data aggregator 308 generates device data associated with the mobile computing device 135 and sends the device data to the travel mobility detector 314. The travel mobility detector 314 generates travel mobility data and sends the travel mobility data to the user efficacy module 316. The situation detector 310 generates situation data describing a current situation and sends the situation data to the user efficacy module 316 and the situational bias modeler 312. The situational bias modeler 312 generates a situational bias model for the current situation and sends the situational bias model to the user efficacy module 316. The affinity subsystem 315 predicts affinity states for items and sends the affinity states as affinity state data to the user efficacy module 316.

The user efficacy module 316 retrieves stakeholder efficacy data from the stakeholder efficacy database 247. The user efficacy module 316 generates a user efficacy model for the user based on one or more of the user attribute data, the item attribute data, the group ID, the group efficacy model, the stakeholder efficacy data, the affinity states, the situational bias model, the situation data and the travel mobility data. The user efficacy module 316 stores the user efficacy model in the storage 245. In some embodiments, the user efficacy module 316 sends the user efficacy model to the group efficacy module 318.

Example Score Estimator

Referring now to FIG. 4A, an example of the score estimator 210 is shown in more detail. In the illustrated embodiment, the score generator 210 includes the user attribute module 302, the item attribute module 304, the group module 306, the device data aggregator 308, the situation detector 310, the situational bias modeler 312, the travel mobility detector 314, the affinity subsystem 315, the score generator 402 and the stakeholder efficacy module 320. The structure, acts and/or functionality of the user attribute module 302, the item attribute module 304, the group module 306, the device data aggregator 308, the situation detector 310, the situational bias modeler 312, the travel mobility detector 314, the affinity subsystem 315 and the stakeholder efficacy module 320 are described above, and their description will not be repeated here.

The score generator 402 can be code and routines for generating an efficacy score for an item. In some embodiments, the score generator 402 receives one or more of stakeholder efficacy data from the stakeholder efficacy module 320, user attribute data associated with the user from the user attribute module 302, item attribute data associated with a set of candidate items from the item attribute module 304, affinity states for a set of candidate items from the affinity subsystem 315, group IDs associated with the candidate items from the group module 306, situation data describing a current situation from the situation detector 310, a situational bias model for the current situation from the situational bias modeler 312, travel mobility data from the travel mobility detector 314 and a user efficacy model associated with the user from the user efficacy module 316.

In some embodiments, the score generator 402 receives device data associated with the mobile computing device 135 from the device data aggregator 308. The score generator 402 determines device bias data for the mobile computing device 135 based on the device data. The device bias data can be data describing one or more scoring preferences configured for the mobile computing device 135. For example, assume the mobile computing device 135 is a vehicle and the device data includes a vehicle model and a vehicle type for the vehicle. The score generator 402 generates the device bias data as vehicle bias data configured to be biased on efficacy score generation for different types of vehicles. For example, if the user drives an electric vehicle, the vehicle bias data indicates to generate higher efficacy scores for places with charging stations nearby; however, if the user drives a gasoline vehicle, the vehicle bias data indicates to generate higher efficacy scores for places with gas stations nearby. The device bias data (e.g., the vehicle bias data) is not encoded into the user efficacy model, so that the score generator 402 can apply the same user efficacy model to generate efficacy scores even if different mobile computing devices 135 (e.g., different types of vehicles) are operated by the user.

The score generator 402 generates an efficacy score for each candidate item based on one or more of the stakeholder efficacy data, the user efficacy model, the user attribute data, the item attribute data including affinity states, the group IDs, the situation data, the situational bias model, the travel mobility data, the device data and the device bias data. For example, if (1) a user efficacy model encodes stakeholder efficacy data indicating not to provide bar recommendations to users under 21 years old and (2) the user attribute data indicates the user is 20 years old, then the score generator 402 generates low efficacy scores (e.g., zero efficacy scores) for candidate places that include bars. The score generator 402 may eliminate the candidate places including bars from the set of candidate items. In another example, if the user efficacy model encodes a maximal trip offset distance to be 10 miles, the score generator 402 generates higher affinity scores for candidate places that are within the maximal trip offset distance and lower affinity scores for candidate places that are not within the maximal trip offset distance. In yet another example, if the user drives an electric vehicle, the score generator 402 generates higher efficacy scores for places with charging stations nearby according to the vehicle bias data; however, if the user drives a gasoline vehicle, the score generator 402 generates higher efficacy scores for places with gas stations nearby. In still yet another example, if the situation data indicates the user is merging lanes on a highway, the score generator 402 generates low efficacy scores for candidate items that may distract the user from driving.

In some embodiments, the score generator 402 sends efficacy scores it generates for the set of candidate items to the recommendation module 212. In additional embodiments, the score generator 402 stores the efficacy scores it generates in the storage 145 and/or the storage 245.

Referring to FIG. 4B, another example of the score estimator 210 is described in more detail. As illustrated in FIG. 4B, the score generator 402 generates an efficacy score for a candidate item based on one or more of the user attribute data received from the user attribute module 302, the item attribute data received from the item attribute module 304, the group ID received from the group module 306, the stakeholder efficacy data retrieved from the stakeholder efficacy database 247, the travel mobility data received from the travel mobility detector 314, the device data received from the device data aggregator 308, the situation data received from the situation detector 310, the situational bias model received from the situational bias modeler 312, the affinity state data received from the affinity subsystem 315, the user efficacy model retrieved from the storage 245 and the device bias data retrieved from the storage 245.

It should be understood that the description for the various modules shown in FIGS. 3A-4B is provided by way of example and numerous other variations are possible. In some embodiments, the various modules may retrieve data from the storage device 145 and/or the storage device 245 and use the data to provide the acts and/or functionality described herein. The various modules may store data in the storage device 145 and/or the storage device 245. In additional embodiments, the various modules may receive data directly from other modules and use the data to provide the acts and/or functionality described herein. The various modules may send data directly to other modules.

Methods

Figure 5A:
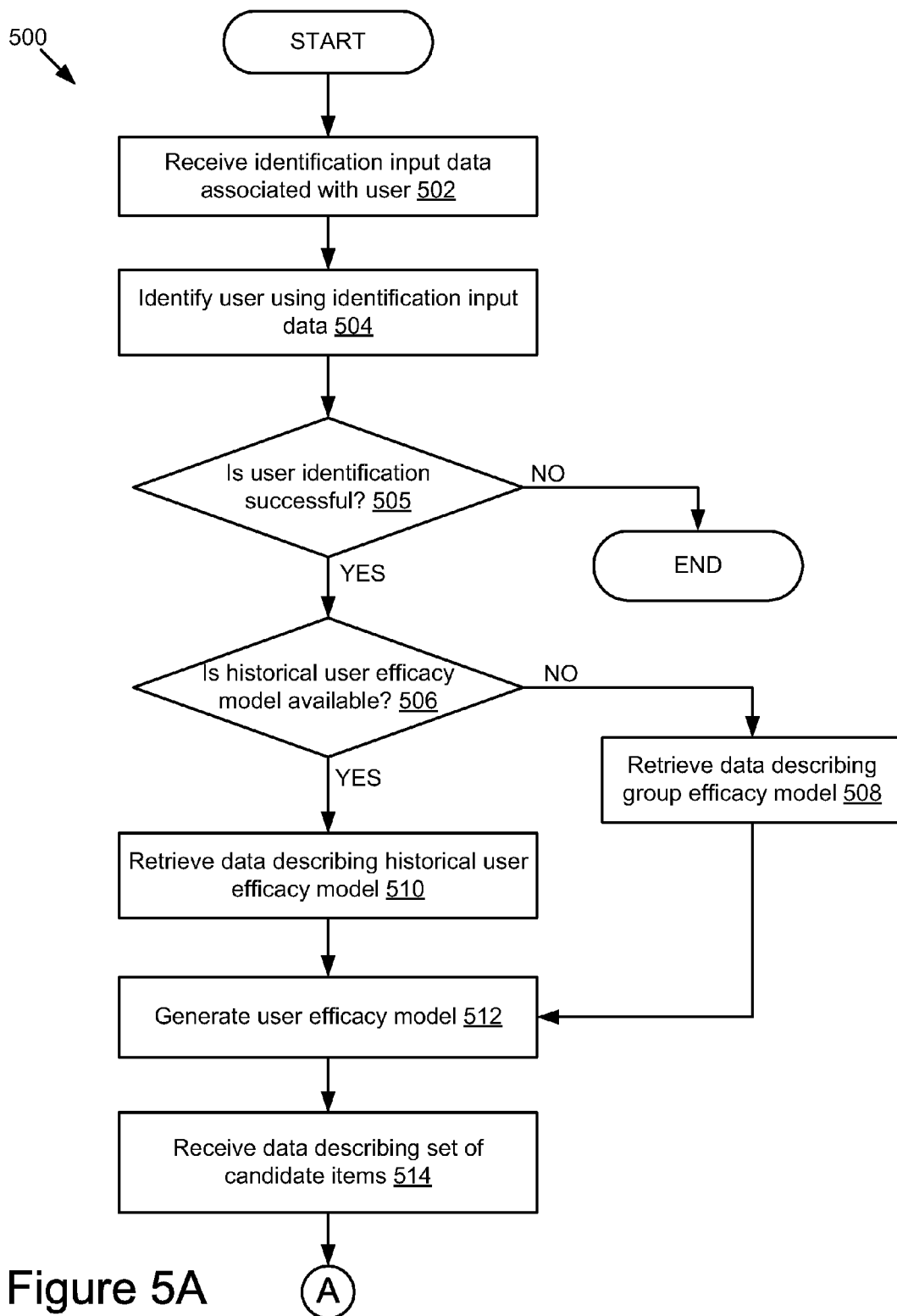
FIGS. 5A and 5B are flowcharts of an example method for providing recommendation items to users based on efficacy models.
Figure 5B:
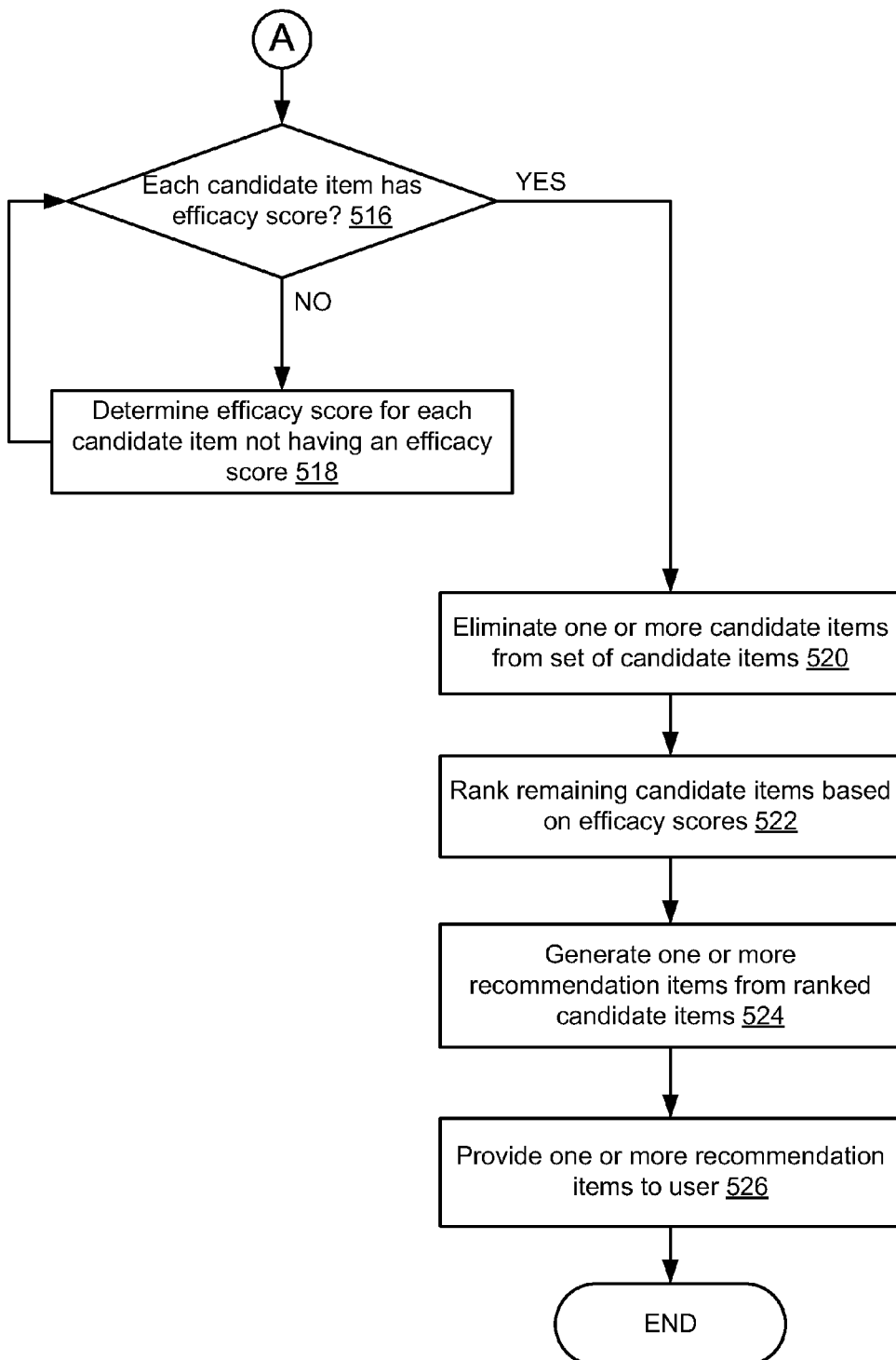

FIGS. 5A and 5B are flowcharts of an example method 500 for providing recommendation items to users based on efficacy models. Referring to FIG. 5A, the controller 202 receives 502 identification input data associated with a user. The identification module 204 identifies 504 the user using the identification input data. An example method 600 for identifying a user is illustrated with reference to FIG. 6. The model generator 208 determines 505 whether the user identification is successful. If the user identification is successful, the method 500 moves to block 506. Otherwise, the method 500 ends or repeats. At block 506, the model generator 208 determines whether a historical user efficacy model associated with the user is available. If a historical user efficacy model associated with the user exists, the method 500 moves to block 510. Otherwise, the controller 202 retrieves 508 data describing a group efficacy model from the storage 245 and the method 500 moves to block 512. Turning to block 510, the controller 202 retrieves data describing the historical user efficacy model from the storage 245. The model generator 208 generates 512 a user efficacy model for the user. An example method 700 for generating a user efficacy model is illustrated with reference to FIGS. 7A-7C. In some embodiments, the controller 202 receives 514 data describing a set of candidate items.

Referring to FIG. 5B, the score estimator 210 determines 516 whether each candidate item in the set of candidate items has an efficacy score. If each candidate item has an efficacy score, the method 500 moves to block 520. Otherwise, the method 500 moves to block 518. At block 518, the score estimator 210 determines 518 an efficacy score for each candidate item not having an efficacy score and the method 500 moves to block 516. An example method 800 for generating an efficacy score for a candidate item is illustrated with reference to FIGS. 8A-8C.

Turning to block 520, the recommendation module 212 eliminates one or more candidate items from the set of candidate items. For example, the recommendation module 212 eliminates one or more candidate items that do not satisfy the stakeholder efficacy data from the set of candidate items. The recommendation module 212 ranks 522 the remaining candidate items based on associated efficacy scores. The recommendation module 212 generates 524 one or more recommendation items from the ranked candidate items. For example, the recommendation module 212 may determine one or more candidate items to recommend to the user based on the ranked candidate items. The recommendation module 212 provides 526 the one or more recommendation items to the user.

Figure 6:
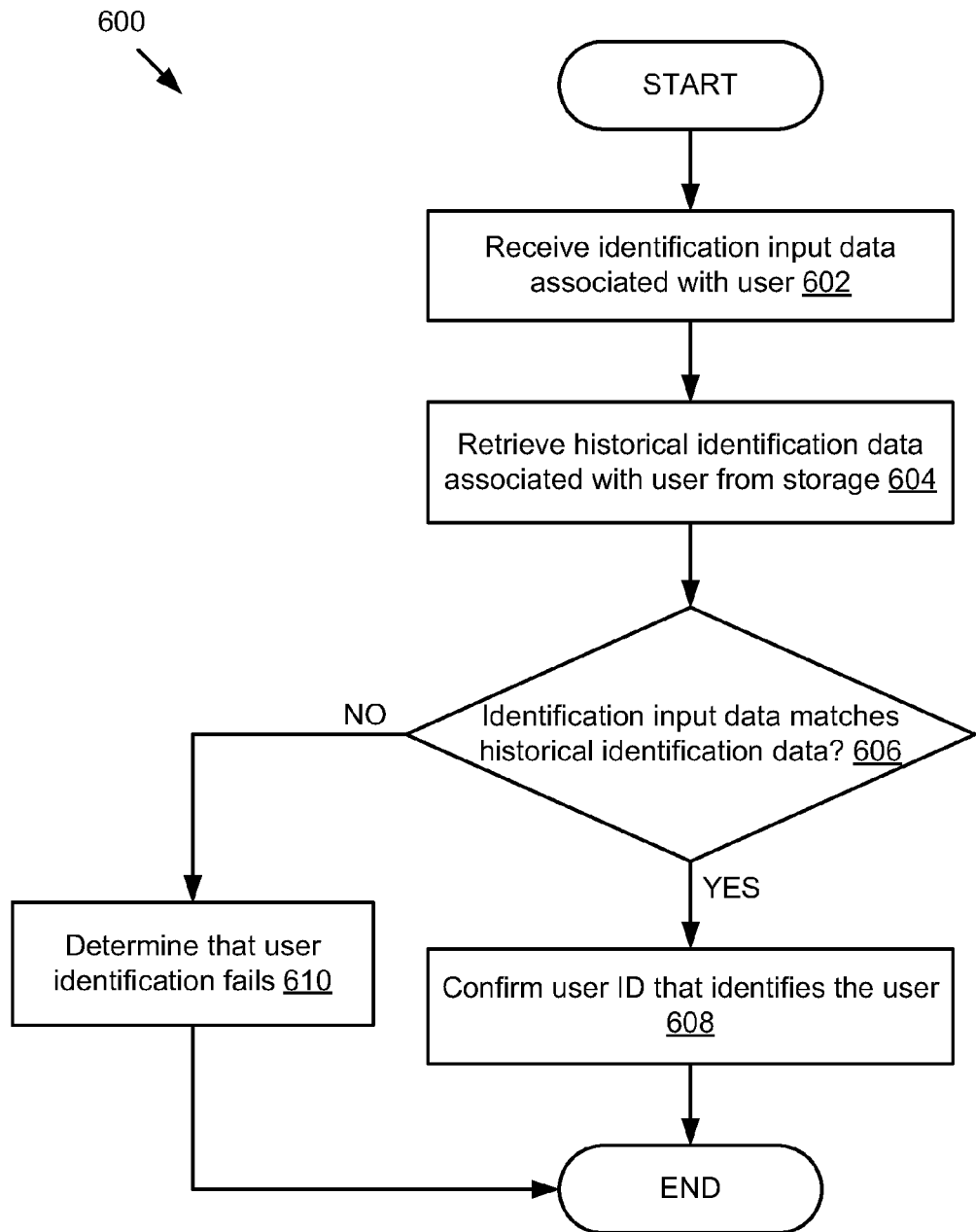
FIG. 6 is a flowchart of an example method for identifying a user.

FIG. 6 is a flowchart of an example method 600 for identifying a user. The controller 202 receives 602 identification input data associated with a user from one or more first sensors 140 and/or one or more second sensors 160. The controller 202 retrieves 604 historical identification data associated with the user from the storage 245 and/or the storage 145. The identification module 204 determines 606 whether the identification input data matches the historical identification data. If the identification input data matches the historical identification data, the identification module 204 confirms 608 a user ID that identifies the user. Otherwise, the identification module 204 determines 610 that the user identification fails.

Figure 7A:
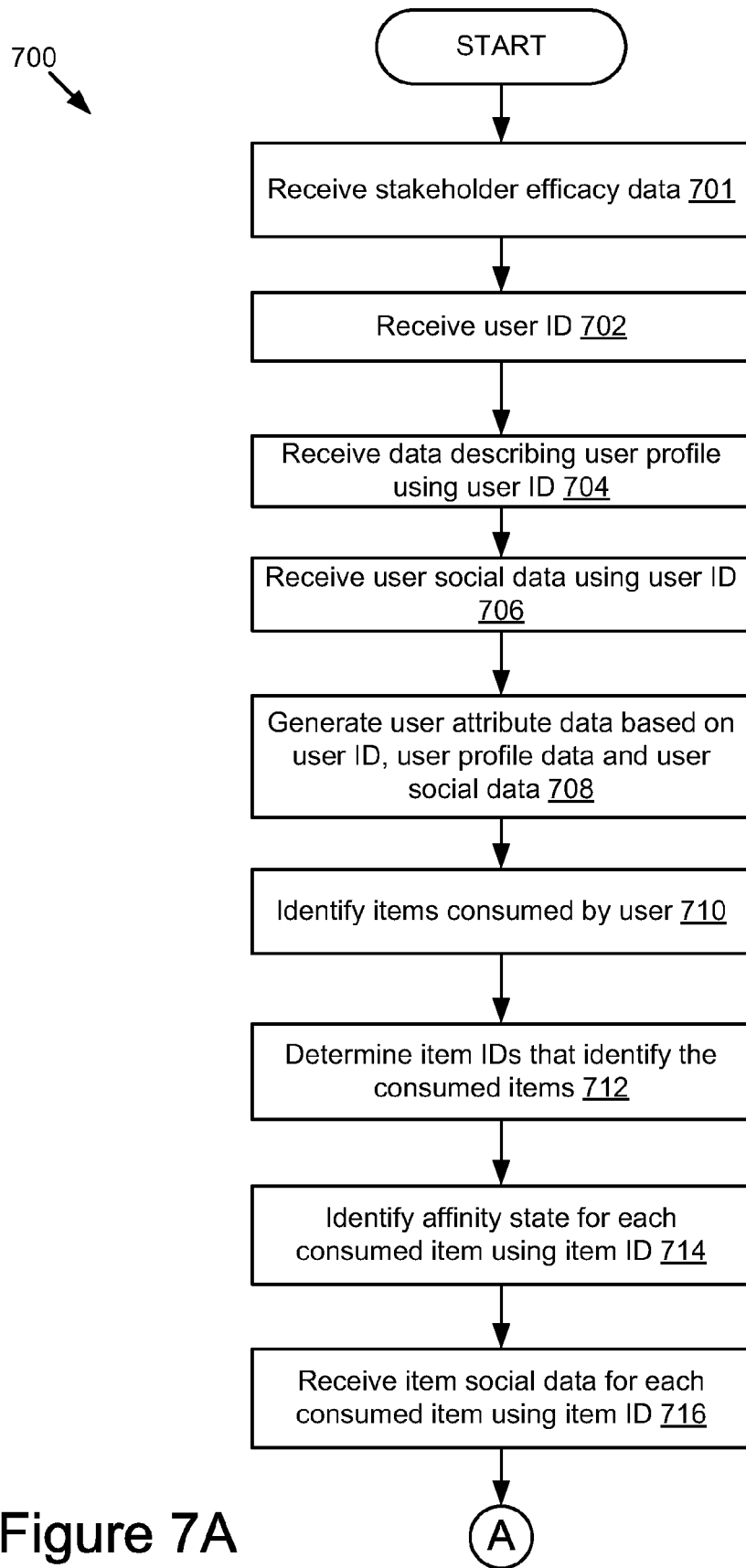
FIGS. 7A-7C are flowcharts of an example method for generating a user efficacy model.
Figure 7B:
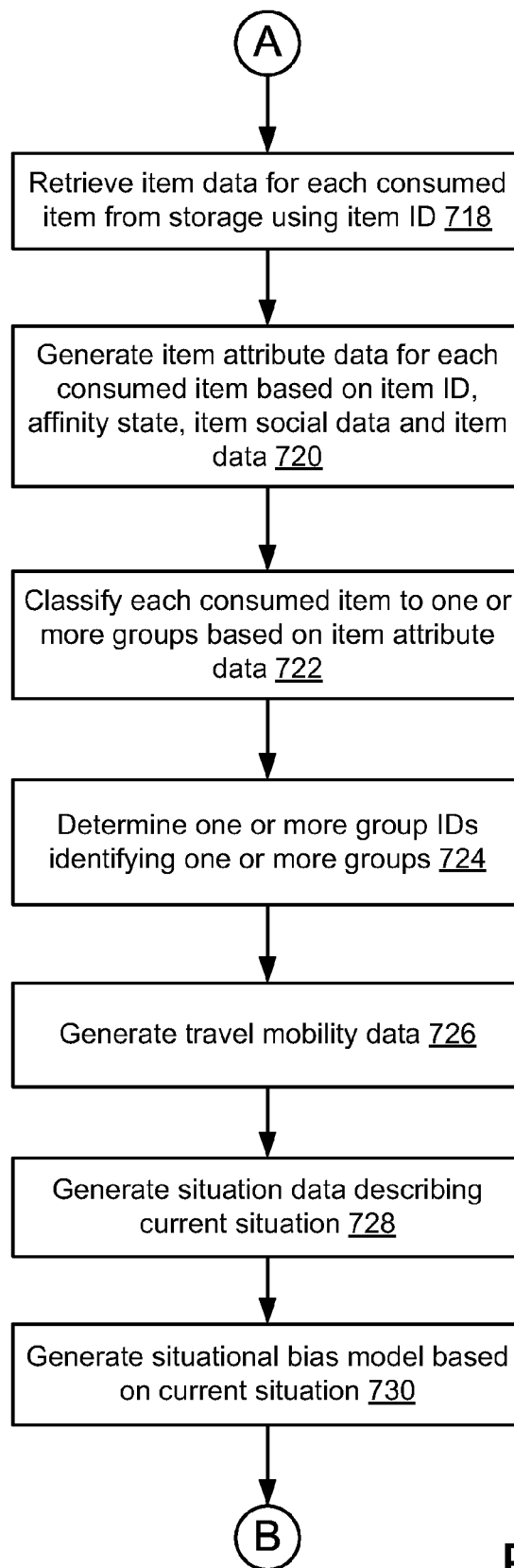
Figure 7C:
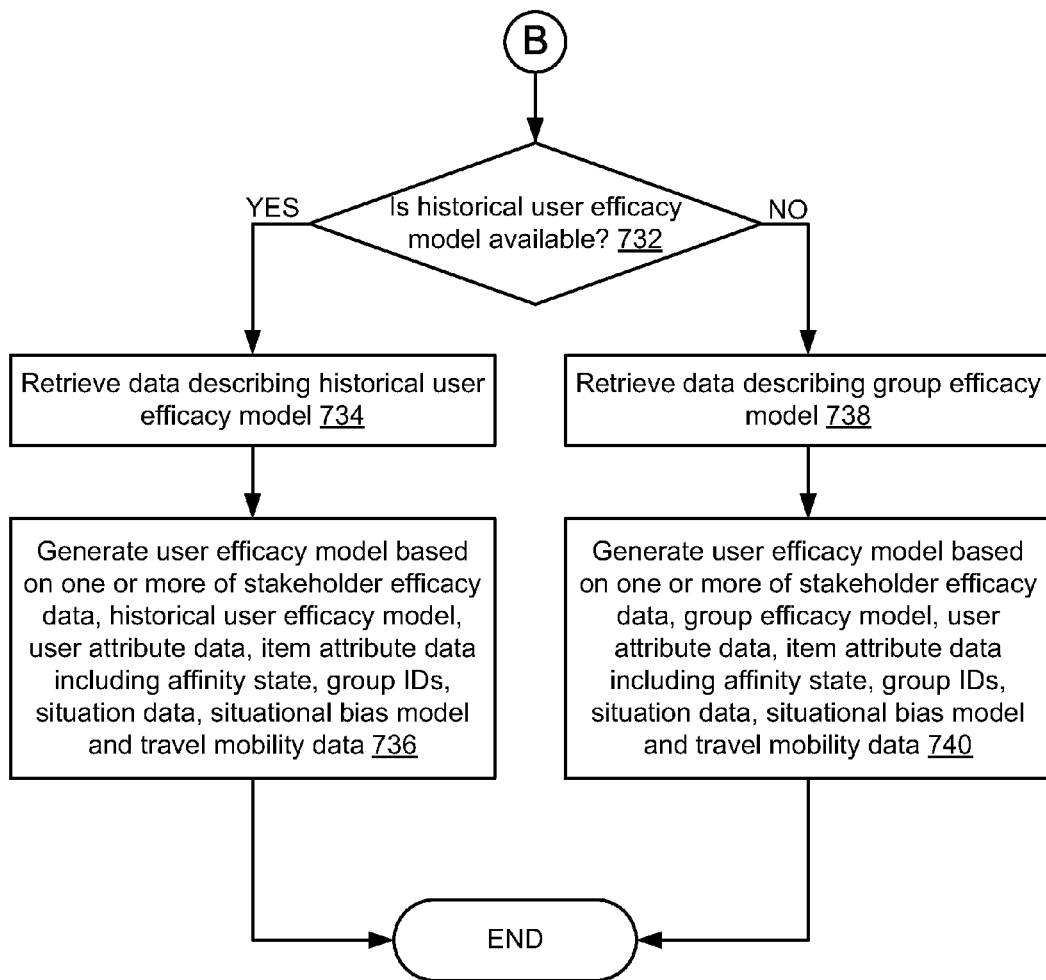

FIGS. 7A-7C are flowcharts of an example method 700 for generating a user efficacy model. Referring to FIG. 7A, the controller 202 receives 701 stakeholder efficacy data from the stakeholder efficacy database 247. The controller 202 receives 702 a user ID from the user identification module 204. The controller 202 receives 704 data describing a user profile from the storage 245 and/or the storage 145 using the user ID. The controller 202 receives 706 user social data from the social network server 130 using the user ID. The user attribute module 302 generates 708 user attribute data based on the user ID, the user profile data and the user social data. The consumption module 206 identifies 710 items consumed by the user. An example method 900 for identifying items consumed by a user is illustrated with reference to FIG. 9. The consumption module 206 determines 712 item IDs that identify the consumed items. The affinity state module 207 identifies 714 an affinity state for each consumed item using a respective item ID identifying the consumed item. An example method 1000 for identifying an affinity state for an item is illustrated with reference to FIG. 10. The controller 202 receives 716 item social data for each consumed item using the respective item ID.

Referring to FIG. 7B, the controller 202 retrieves 718 item data for each consumed item from the storage 245 and/or the storage 145 using the respective item ID. The item attribute module 304 generates 720 item attribute data for each consumed item based on the corresponding item ID, the affinity state, the item social data and the item data. The group module 306 classifies 722 each consumed item to one or more groups based on the item attribute data associated with the consumed item. The group module 306 determines 724 one or more group IDs identifying the one or more groups. The travel mobility detector 314 generates 726 travel mobility data. An example method 1100 for generating travel mobility data is illustrated with reference to FIG. 11. The situation detector 310 generates 728 situation data describing a current situation. An example method 1200 for generating situation data is illustrated with reference to FIG. 12. The situational bias modeler 312 generates 730 a situational bias model based on the current situation.

Referring to FIG. 7C, the user efficacy module 316 determines 732 whether a historical user efficacy model associated with the user is available. If a historical user efficacy model associated with the user exists, the method 700 moves to block 734. Otherwise, the method 700 moves to block 738. Turning to block 734, the controller 202 retrieves data describing a historical user efficacy model associated with the user from the storage 245 and/or the storage 145. The user efficacy module 316 generates 736 a user efficacy model for the user based on one or more of the stakeholder efficacy data, the historical user efficacy model, the user attribute data, the item attribute data including the affinity states, the group IDs, the situation data, the situational bias model and the travel mobility data. Turning to block 738, the controller 202 retrieves data describing a group efficacy model from the storage 245 and/or the storage 145. The user efficacy module 316 generates 740 a user efficacy model for the user based on one or more of the stakeholder efficacy data, the group efficacy model, the user attribute data, the item attribute data including the affinity states, the group IDs, the situation data, the situational bias model and the travel mobility data.

Figure 8A:
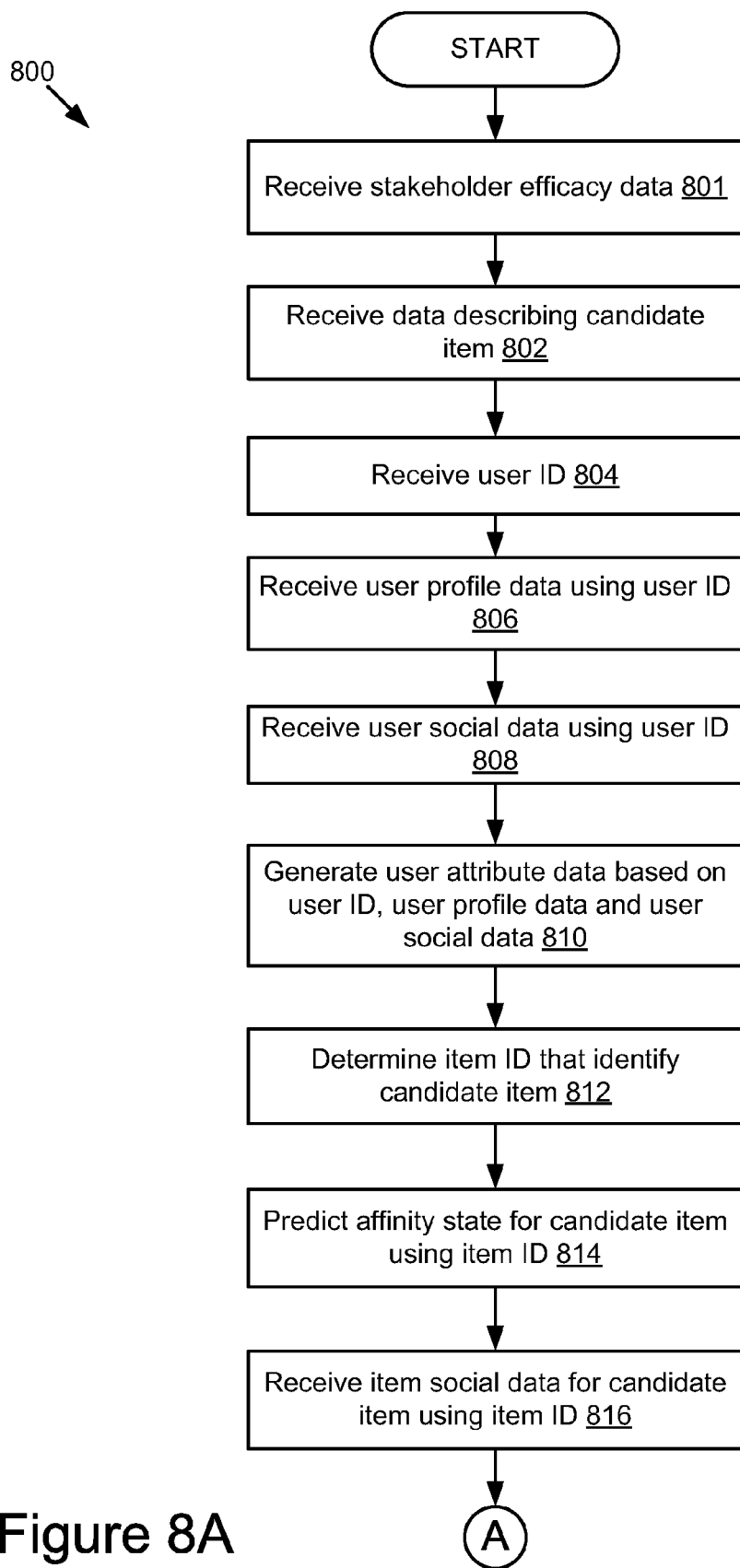
FIGS. 8A-8C are flowcharts of an example method for generating an efficacy score for a candidate item.
Figure 8B:
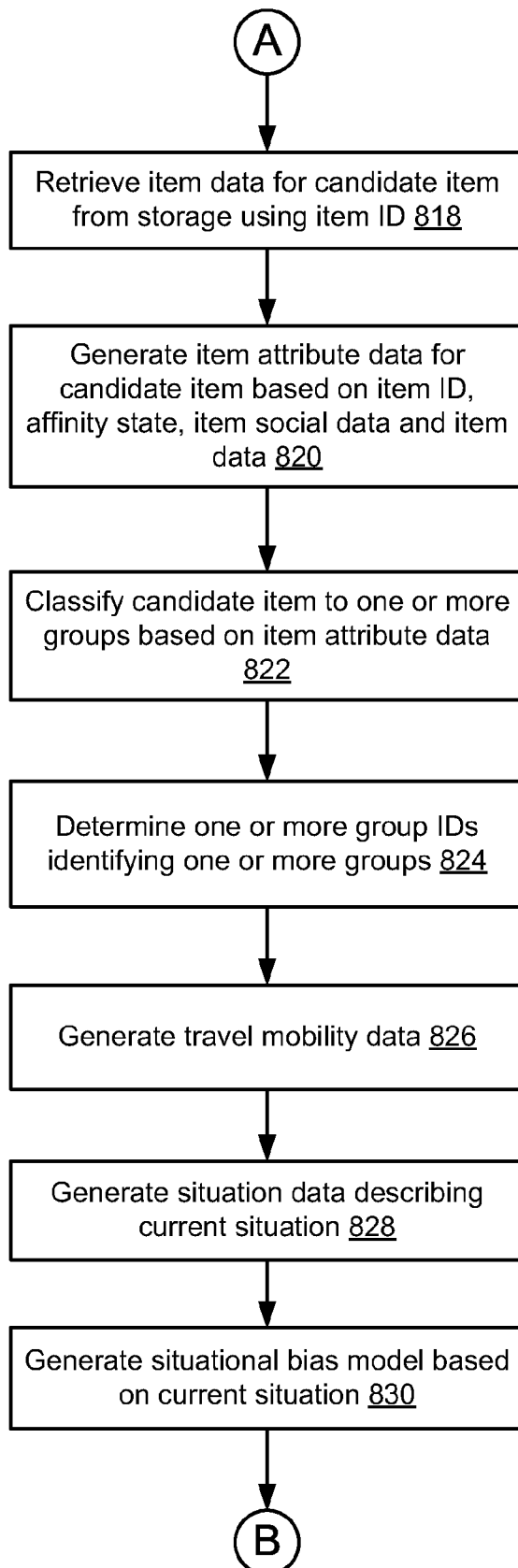
Figure 8C:
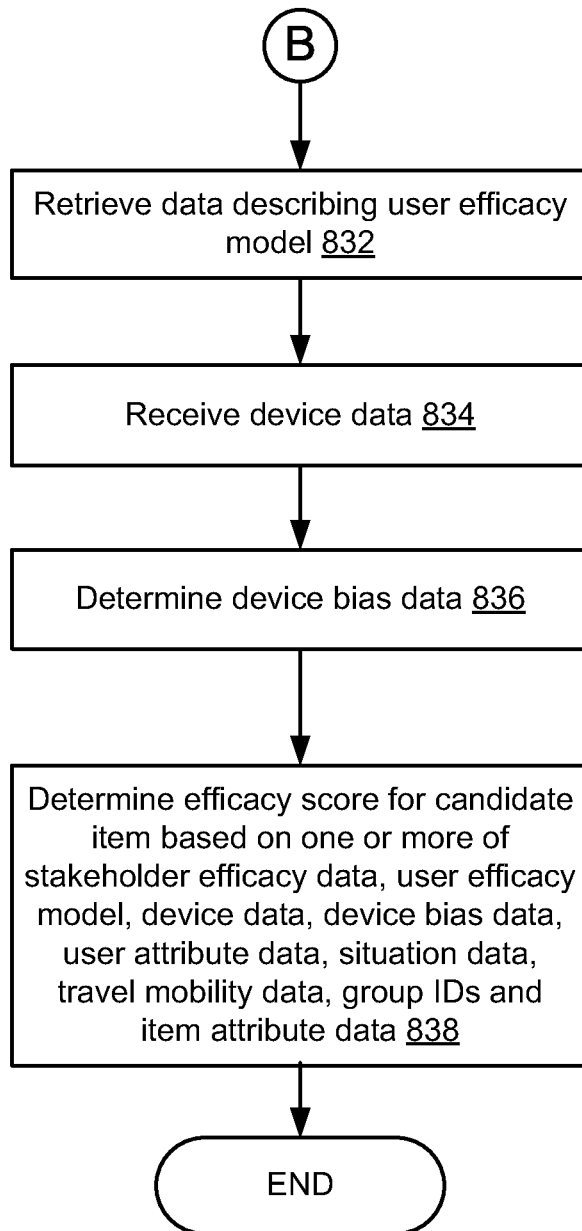

FIGS. 8A-8C are flowcharts of an example method 800 for generating an efficacy score for a candidate item. Referring to FIG. 8A, the controller 202 receives 801 stakeholder efficacy data from the stakeholder efficacy database 247. The controller 202 receives 802 data describing a candidate item. The controller 202 receives 804 a user ID from the user identification module 204. The controller 202 receives 806 user profile data from the storage 245 and/or the storage 145 using the user ID. The controller 202 receives 808 user social data from the social network server 130 using the user ID. The user attribute module 302 generates 810 user attribute data based on the user ID, the user profile data and the user social data. The consumption module 206 determines 812 an item ID that identifies the candidate item. The affinity subsystem 315 predicts 814 an affinity state for the candidate item using the item ID. An example method 1600 for predicting an affinity state for an item is illustrated with reference to FIG. 16. The controller 202 receives 816 item social data for the candidate item from the social network server 130 using the item ID.

Referring to FIG. 8B, the controller 202 retrieves 818 item data for the candidate item from the storage 245 and/or the storage 145 using the item ID. The item attribute module 304 generates 820 item attribute data for the candidate item based on the item ID, the affinity state, the item social data and the item data. The group module 306 classifies 822 the candidate item to one or more groups based on the item attribute data associated with the candidate item. The group module 306 determines 824 one or more group IDs identifying the one or more groups. The travel mobility detector 314 generates 826 travel mobility data. An example method 1100 for generating travel mobility data is illustrated with reference to FIG. 11. The situation detector 310 generates 828 situation data describing a current situation associated with the user. An example method 1200 for generating situation data is illustrated with reference to FIG. 12. The situational bias modeler 312 generates 830 a situational bias model based on the current situation.

Referring to FIG. 8C, the controller 202 retrieves 832 data describing a user efficacy model associated with the user from the storage 245 and/or the storage 145. The controller 202 receives 834 device data from the device data aggregator 308. The score generator 402 determines 836 device bias data associated with the mobile computing device 135 based on the device data. The score generator 402 determines 838 an efficacy score for the candidate item based on one or more of the stakeholder efficacy data, the user efficacy model, the device data, the device bias data, the user attribute data, the situation data, the travel mobility data, the group IDs and the item attribute data.

Figure 9:
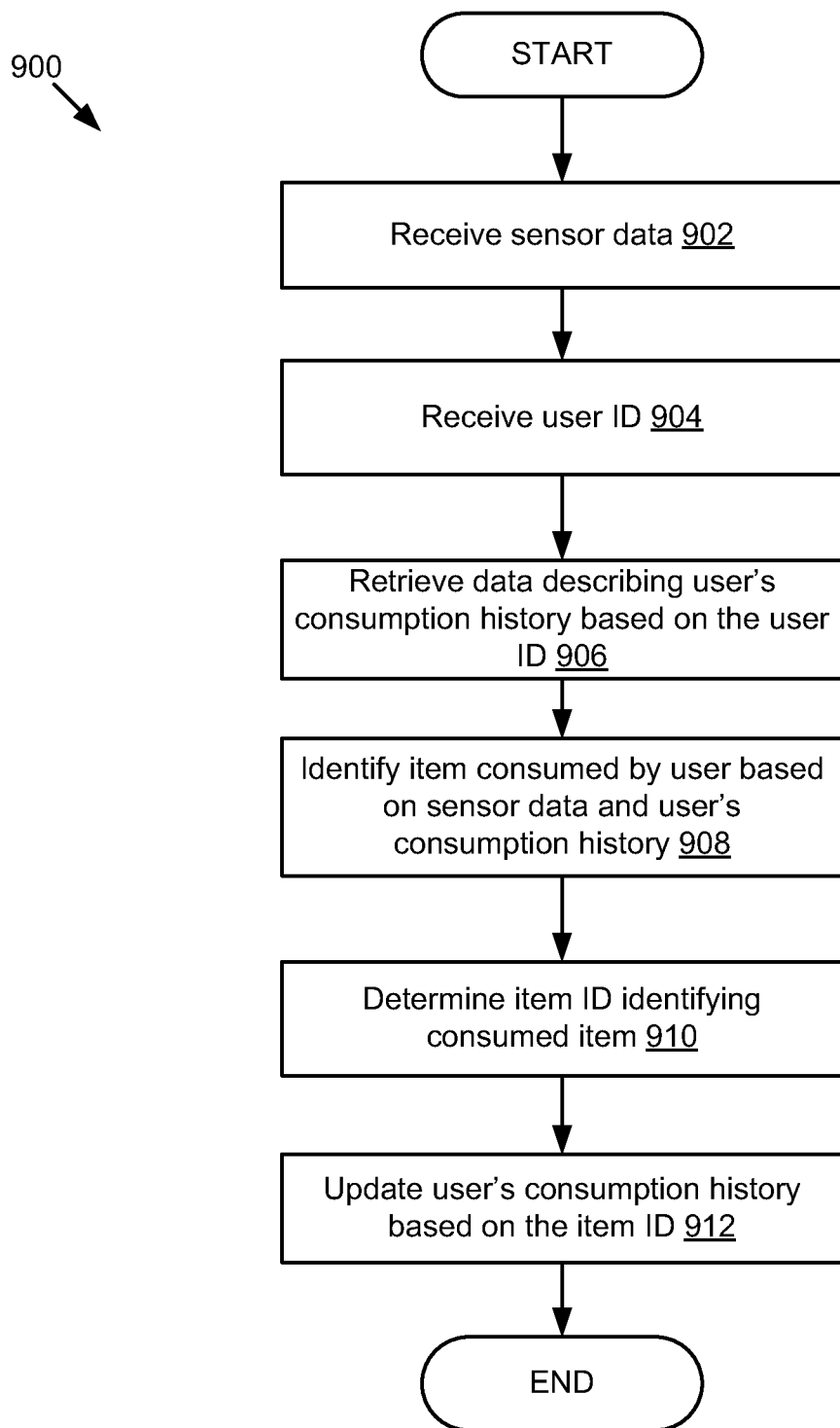
FIG. 9 is a flowchart of an example method for determining items consumed by a user.

FIG. 9 is a flowchart of an example method 900 for determining items consumed by a user. The controller 202 receives 902 sensor data from one or more first sensors 140 and/or one or more second sensors 160. The controller 202 receives 904 a user ID identifying a user from the identification module 204. The controller 202 retrieves 906 data describing the user's consumption history from the storage 145 and/or the storage 245 based on the user ID. The consumption module 206 identifies 908 an item consumed by the user based on the sensor data and the user's consumption history. The consumption module 206 determines 910 an item ID identifying the consumed item. The consumption module 206 updates 912 the user's consumption history based on the item ID.

Figure 10:
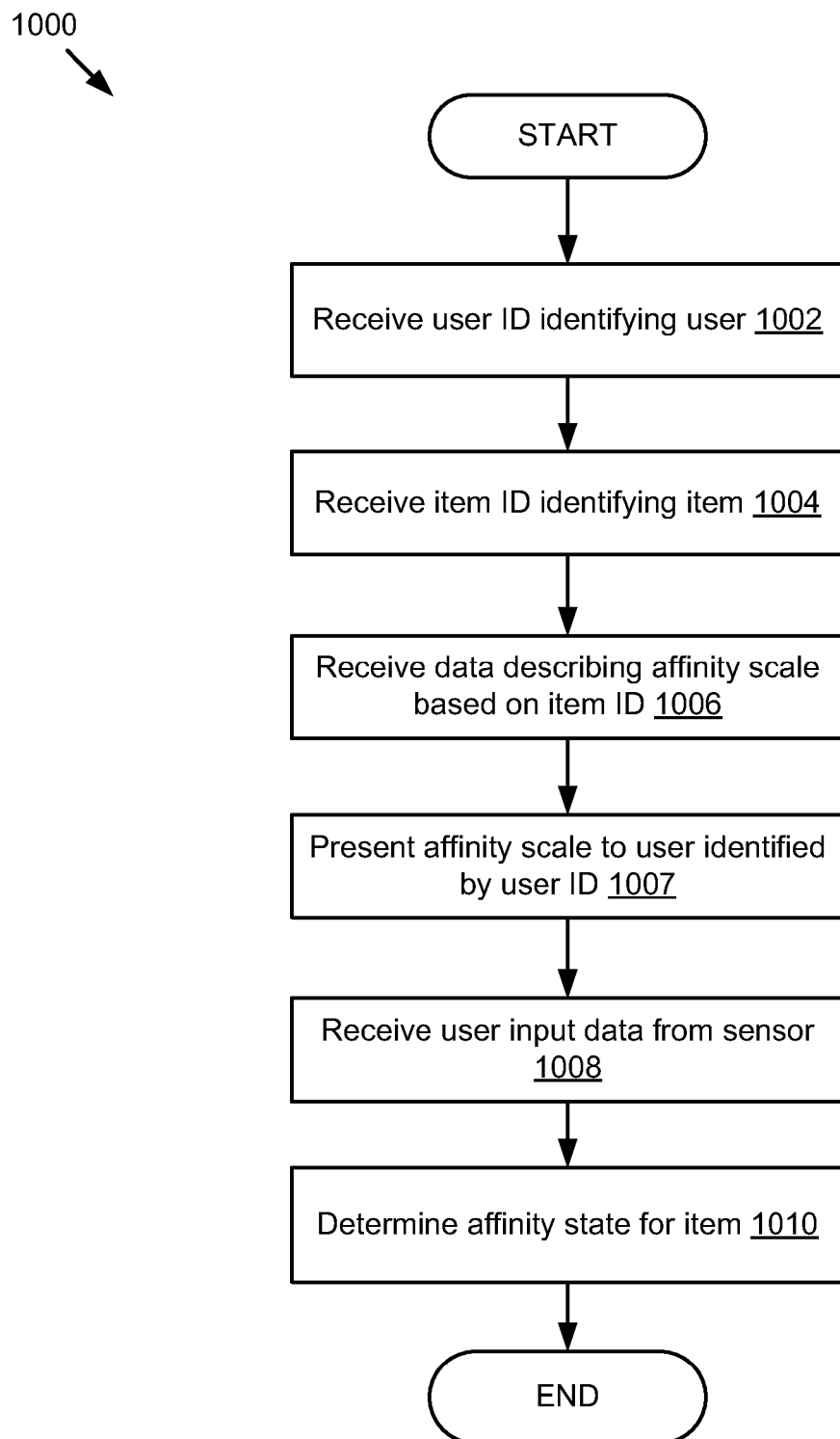
FIG. 10 is a flowchart of an example method for determining an affinity state for an item consumed by a user.

FIG. 10 is a flowchart of an example method 1000 for determining an affinity state for an item consumed by a user. The controller 202 receives 1002 a user ID identifying a user. The controller 202 receives 1004 an item ID identifying an item. The controller 202 receives 1006 data describing an affinity scale for the item based on the item ID. The affinity state module 207 presents 1007 the affinity scale to the user identified by the user ID. The controller 202 receives 1008 user input data from one or more first sensors 140 and/or one or more second sensors 160. The affinity state module 207 determines 1010 an affinity state for the item based on the user input data.

Figure 11:
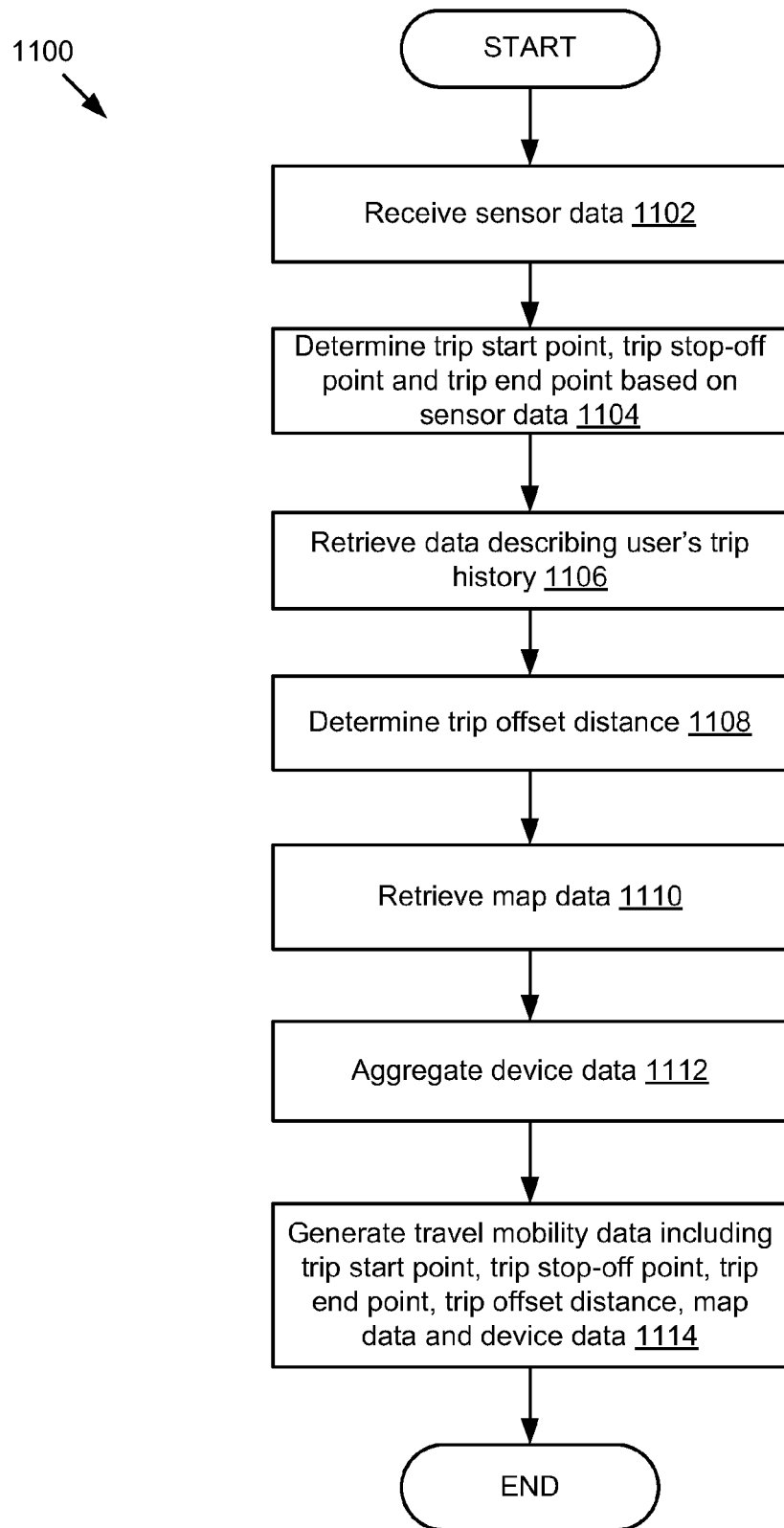
FIG. 11 is a flowchart of an example method for generating travel mobility data.

FIG. 11 is a flowchart of an example method 1100 for generating travel mobility data. The controller 202 receives 1102 sensor data from one or more first sensors 140 and/or one or more second sensors 160. The travel mobility detector 314 determines 1104 one or more of a trip start point, a trip stop-off point and a trip end point for a trip taken by a user based on the sensor data. The controller 202 retrieves 1106 data describing the user's trip history. The travel mobility detector 314 determines 1108 a trip offset distance. The controller 202 retrieves 1110 map data describing a map associated with the trip. The device data aggregator 308 aggregates 1112 device data associated with the mobile computing device 135. The travel mobility detector 314 generates 1114 travel mobility data including one or more of the trip start point, the trip stop-off point, the trip end point, the trip offset distance, the map data and the device data.

Figure 12:
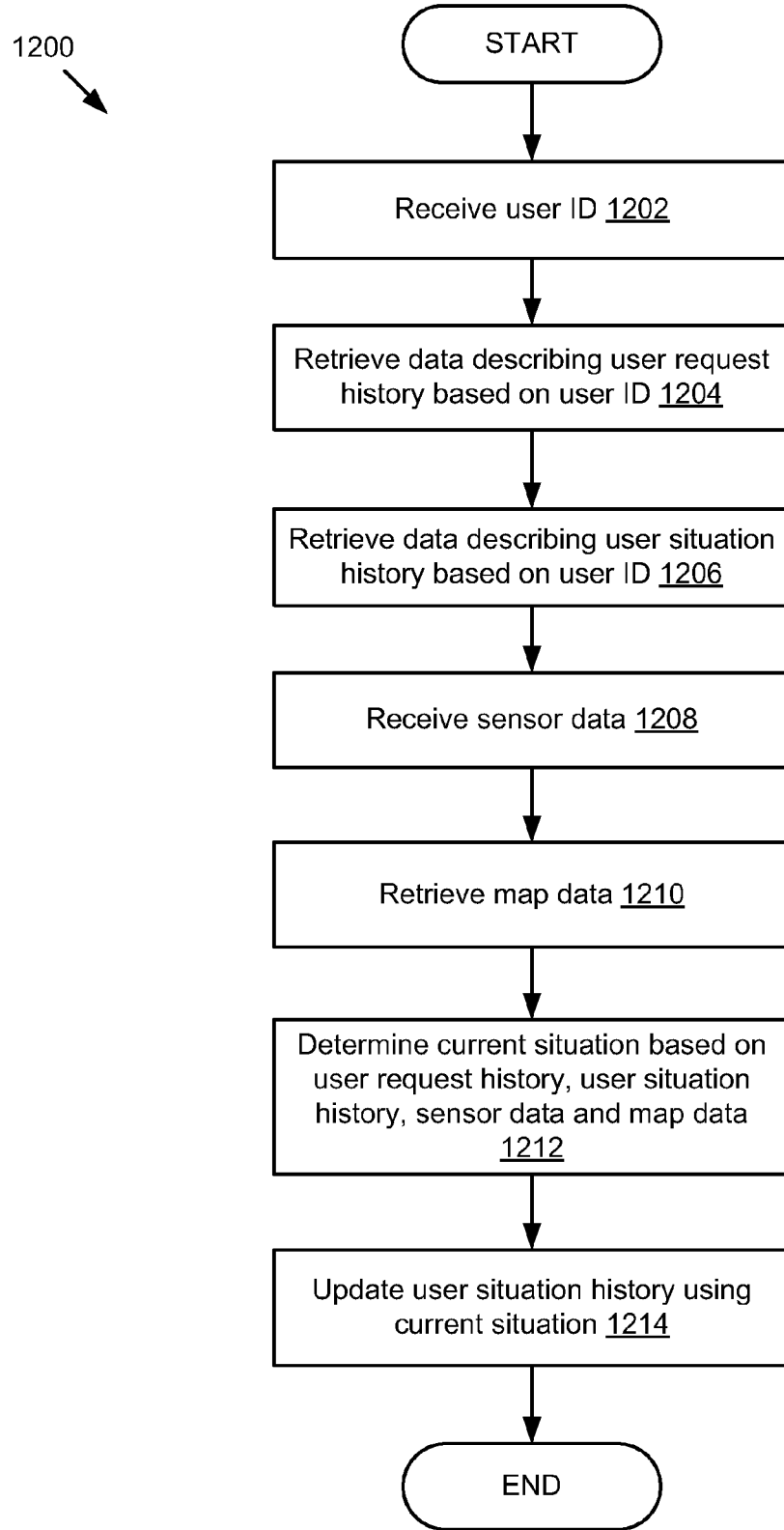
FIG. 12 is a flowchart of an example method for determining a current situation associated with a user.

FIG. 12 is a flowchart of an example method 1200 for determining a current situation associated with a user. The controller 202 receives 1202 a user ID identifying a user. The controller 202 retrieves 1204 data describing a user request history associated with the user from the storage 145 and/or the storage 245 based on the user ID. The controller 202 retrieves 1206 data describing a user situation history based on the user ID. The controller 202 receives 1208 sensor data from one or more first sensors 140 and/or one or more second sensors 160. For example, the one or more first sensors 140 and/or the one or more second sensors 160 may be associated with the mobile computing device 135 of the user. The controller 202 retrieves 1210 map data describing a map associated with a current location associated with the user. The situation detector 310 determines 1212 a current situation associated with the user based on one or more of the user request history, the user situation history, the sensor data and the map data. The situation detector 310 updates 1214 the user situation history using the current situation.

Figure 16:
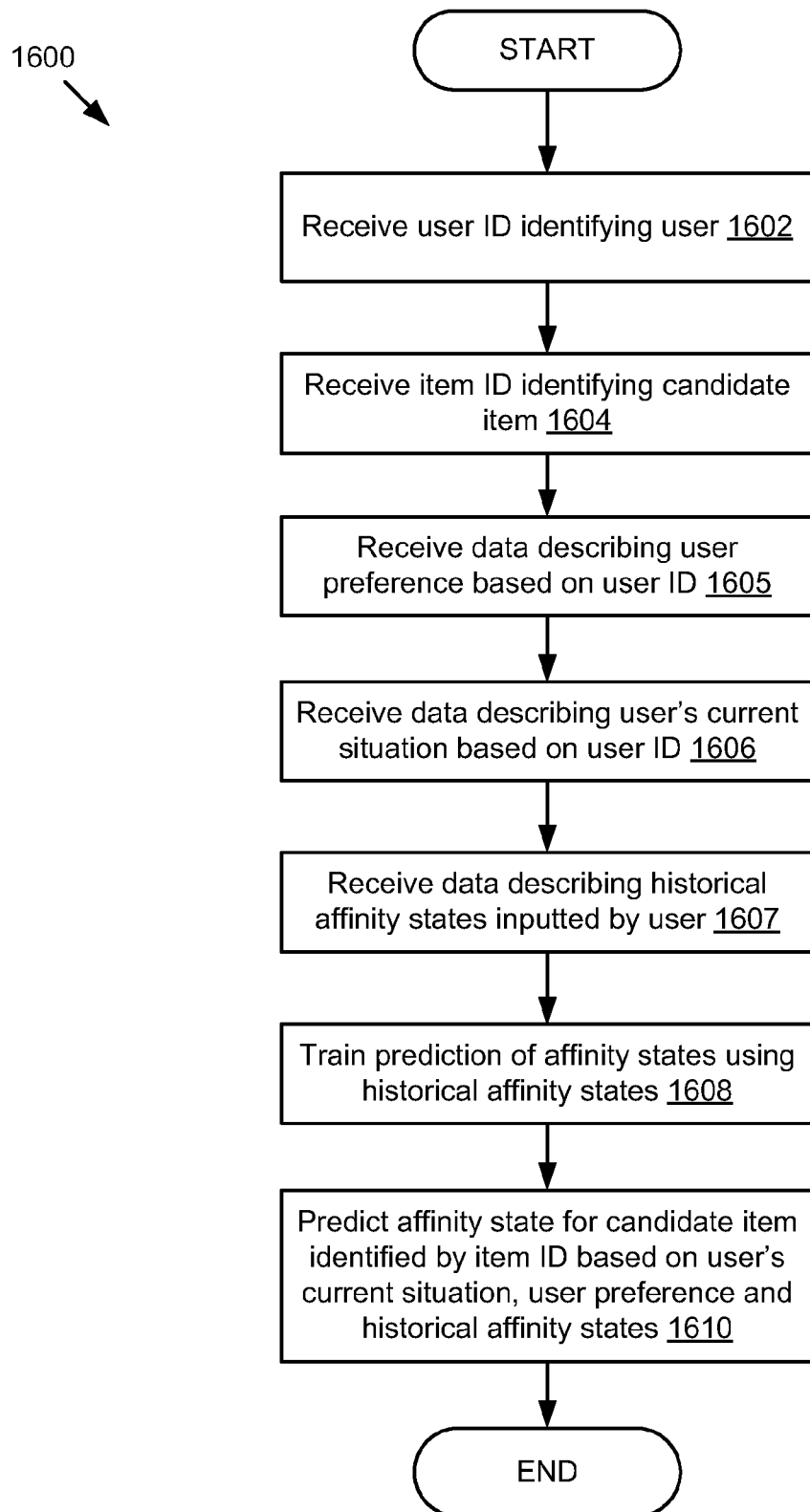
FIG. 16 is a flowchart of an example method for predicting an affinity state for a candidate item.

FIG. 16 is a flowchart of an example method 1600 for predicting an affinity state for a candidate item. The controller 202 receives 1602 a user ID identifying a user. The controller 202 receives 1604 an item ID identifying a candidate item. The controller 202 receives 1605 data describing one or more user preferences based on the user ID. The controller 202 receives 1606 data describing the user's current situation based on the user ID. The controller 202 receives 1607 data describing historical affinity states that are associated with items consumed by the user and inputted by the user. The affinity subsystem 315 trains 1608 the prediction of the affinity states for candidate items using the historical affinity states. The affinity subsystem 315 predicts 1610 an affinity state for the candidate item identified by the item ID based on one or more of the user's current situation, the one or more user preferences and the one or more historical affinity states.

Graphic Representations

Figure 13:
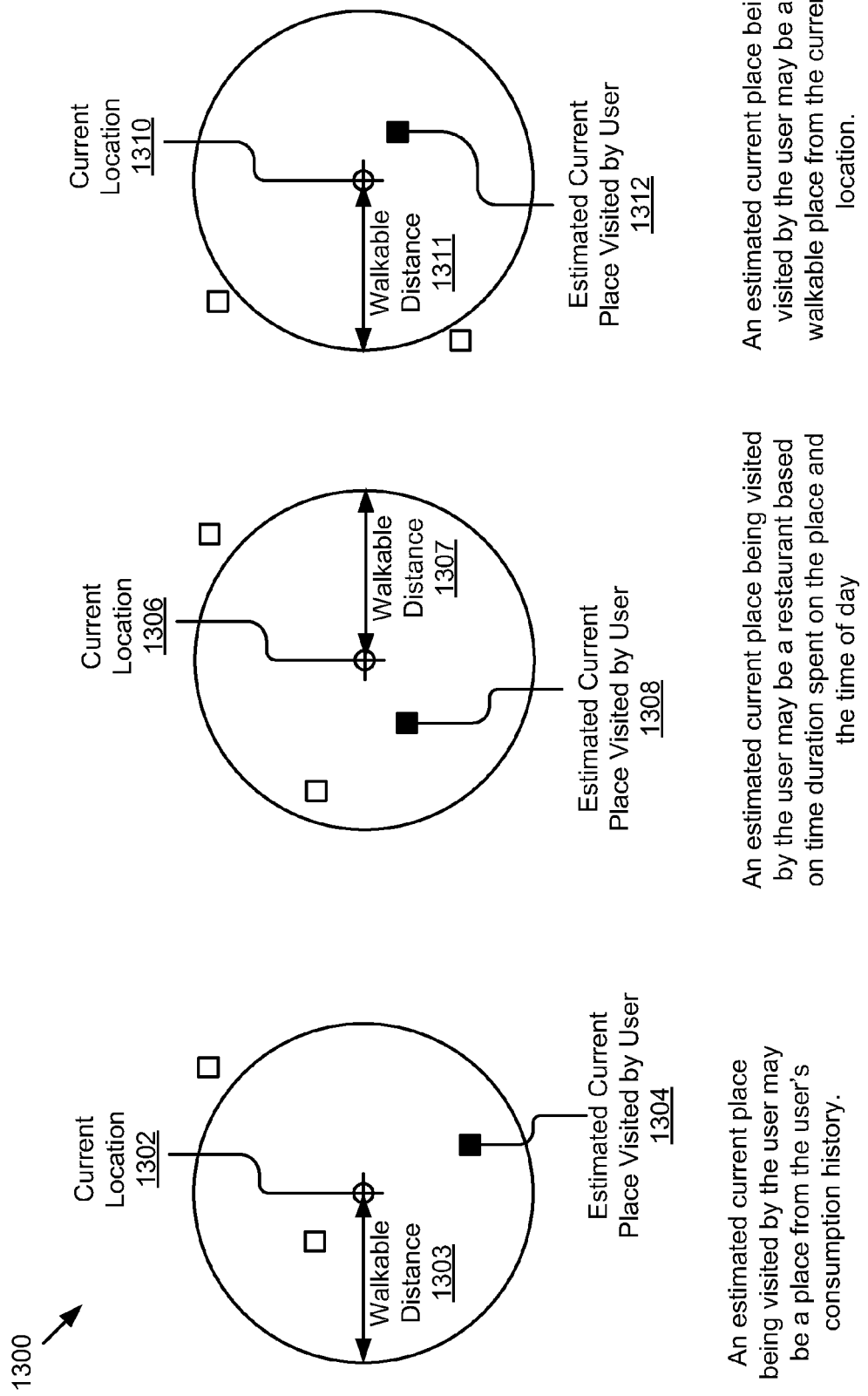
FIG. 13 is a graphic representation illustrating example places consumed by a user.

FIG. 13 is a graphic representation 1300 illustrating example places consumed by a user. For example, the consumption module 206 determines a current location 1302 where the mobile computing device 135 operated by the user is presently located. The consumption module 206 determines one or more candidate places that are within a walkable distance 1303 from the current location 1302. The one or more candidate places include a consumed place from the user's consumption history. The consumed place can be a place that the user has visited in the past. The consumption module 206 estimates a current place 1304 being visited by the user as the consumed place from the user's consumption history since, for example, the user has visited the consumed place previously.

In another example, the consumption module 206 determines a current location 1306 where the mobile computing device 135 is presently located. The consumption module 206 determines one or more candidate places that are within a walkable distance 1307 from the current location 1306. The consumption module 206 estimates a current place 1308 being visited by the user based on the time of the day and the time duration that the mobile computing device 135 stops at the current location 1306. For example, if the time of the day is 7:30 PM and the mobile computing device 135 has already been located at the current location 1306 for more than 45 minutes, the consumption module 206 estimates the current place 1308 being visited by the user as a restaurant.

In yet another example, the consumption module 206 determines a current location 1310 where the mobile computing device 135 is presently located. The consumption module 206 determines that there is only one walkable candidate place within a walkable distance 1311 from the current location 1310. The consumption module 206 estimates the current place 1312 being visited by the user as the walkable candidate place.

FIG. 14 is a graphic representation 1400 illustrating an example user interface that allows a user to input an affinity state for an item. In some embodiments, the example user interface is displayed in an in-vehicle head unit with a touch screen. The user can press the fourth star to denote a ⅘ affinity for a song being played.

FIG. 15 is a graphic representation 1500 illustrating example groups. The example groups include a group of places, a group of people, a group of trips and routes and a group of music. Each of the groups also has one or more sub-groups.

In the above description, for purposes of explanation, numerous specific details are set forth in order to provide a thorough understanding of the specification. It will be apparent, however, to one skilled in the art that the disclosure can be practiced without these specific details. In other implementations, structures and devices are shown in block diagram form in order to avoid obscuring the description. For example, the present implementation is described in one implementation below primarily with reference to user interfaces and particular hardware. However, the present implementation applies to any type of computing device that can receive data and commands, and any peripheral devices providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the subject matter set forth in the following claims.

What is claimed is:

1. A computer-implemented method comprising:
receiving identification input data associated with a user;
verifying an identity of the user using the identification input data;
receiving sensor data;
determining, based on the sensor data and one or more of predefined situation data, a user request history, a user situation history, and map data, a current situation describing a current driving activity associated with the user of a mobile computing device;
receiving data describing a set of candidate items;
classifying each candidate item of the set of candidate items into one or more groups;
determining one or more group IDs for each candidate item based on one or more of the groups in which the candidate item is classified;
determining, for each candidate item, one or more group efficacy models associated with the candidate item, each of the one or more group efficacy models including a particular group of items that includes the candidate item, each of the one or more group efficacy models encoding a bias based on item attributes of the items in the particular group;
generating a user efficacy model for the user using the identity of the user, the one or more group efficacy models associated with each of the candidate items of the set, the one or more group IDs associated with each of the one or more of the candidate items of the set, and the current situation describing the current driving activity;
generating a set of efficacy scores for the set of candidate items based on the current situation and the user efficacy model associated with the user;
eliminating one or more candidate items from the set of candidate items to obtain one or more remaining candidate items;
ranking the one or more remaining candidate items based on one or more efficacy scores associated with the one or more remaining candidate items; and
providing one or more recommendation items to the user from the one or more ranked remaining candidate items.

2. The method of claim 1, further comprising:
receiving stakeholder efficacy data defined by a stakeholder;
generating the user efficacy model further based on the stakeholder efficacy data; and
generating the set of efficacy scores further based on the stakeholder efficacy data.

3. The method of claim 1, further comprising:
aggregating device data associated with the mobile computing device;
determining device bias data describing one or more scoring preferences configured for the mobile computing device; and
generating the set of efficacy scores further based on the device data and the device bias data.

4. The method of claim 1, further comprising:
determining, based on the current situation, a situational bias model that describes one or more situational constraints to be satisfied; and
generating the user efficacy model further based on the situational bias model.

5. The method of claim 1, further comprising:
storing the user efficacy model as a historical user efficacy model in association with the user;
upon a subsequent iteration of one or more operations of the method, determining that the historical user efficacy model associated with the user exists; and
generating the user efficacy model further based on the historical user efficacy model.

6. The method of claim 1, wherein generating the user efficacy model for the user further comprises:
retrieving a group efficacy model associated with the user; and
generating the user efficacy model further based on the group efficacy model.

7. The method of claim 1, further comprising:
retrieving user profile data associated with the user;
retrieving user social data associated with the user;
generating user attribute data associated with the user based on the user profile data and the user social data;
generating the user efficacy model further based on the user attribute data; and
generating the set of efficacy scores further based on the user attribute data.

8. The method of claim 1, further comprising:
identifying one or more items consumed by the user;
identifying one or more affinity states for the one or more consumed items;
retrieving item social data associated with the one or more consumed items;
generating item attribute data associated with the one or more consumed items based on the one or more affinity states and the item social data;
classifying the one or more consumed items into one or more groups;
determining one or more group identifiers that identify the one or more groups; and
generating the user efficacy model based on one or more of the item attribute data, the current situation and the one or more group identifiers.

9. The method of claim 1, further comprising:
determining a trip start point, a trip stop-off point and a trip end point associated with a trip based on the sensor data;

retrieving data describing a trip history associated with the user;

determining a trip offset distance based on one or more of the trip history, the trip start point, the trip stop-off point and the trip end point;

aggregating device data associated with the mobile computing device;

generating travel mobility data associated with the mobile computing device, the travel mobility data including one or more of the trip start point, the trip end point, the trip stop-off point, the trip offset distance and the device data; and generating the set of efficacy scores further based on the travel mobility data.

10. A computer program product comprising a non-transitory computer usable medium including a computer readable program, wherein the computer readable program when executed on a computer causes the computer to:

receive identification input data associated with a user;

verify an identity of the user using the identification input data;

receive sensor data;

determine, based on the sensor data and one or more of predefined situation data, a user request history, a user situation history, and map data, a current situation describing a current driving activity associated with the user of a mobile computing device;

receive data describing a set of candidate items;

classify each candidate item of the set of candidate items into one or more groups;

determine one or more group IDs for each candidate item based on one or more of the groups in which the candidate item is classified;

determine, for each candidate item, one or more group efficacy models associated with the candidate item, each of the one or more group efficacy models including a particular group of items that includes the candidate item, each of the one or more group efficacy models encoding a bias based on item attributes of the items in the particular group;

generate a user efficacy model for the user using the identity of the user, the one or more group efficacy models associated with each of the candidate items of the set, the one or more group IDs associated with each of the one or more of the candidate items of the set, and the current situation describing the current driving activity;

generate a set of efficacy scores for the set of candidate items based on the current situation and the user efficacy model associated with the user;

eliminate one or more candidate items from the set of candidate items to obtain one or more remaining candidate items;

rank the one or more remaining candidate items based on one or more efficacy scores associated with the one or more remaining candidate items; and provide one or more recommendation items to the user from the one or more ranked remaining candidate items.

11. The computer program product of claim 10, wherein the computer readable program when executed on the computer causes the computer to also:

receive stakeholder efficacy data defined by a stakeholder;

generate the user efficacy model further based on the stakeholder efficacy data; and generate the set of efficacy scores further based on the stakeholder efficacy data.

12. The computer program product of claim 10, wherein the computer readable program when executed on the computer causes the computer to also:

aggregate device data associated with the mobile computing device;

determine device bias data describing one or more scoring preferences configured for the mobile computing device; and generate the set of efficacy scores further based on the device data and the device bias data.

13. The computer program product of claim 10, wherein the computer readable program when executed on the computer causes the computer to also:

determine, based on the current situation, a situational bias model that describes one or more situational constraints to be satisfied; and generate the user efficacy model further based on the situational bias model.

14. The computer program product of claim 10, wherein the computer readable program when executed on the computer causes the computer to also:

store the user efficacy model as a historical user efficacy model in association with the user;

upon a subsequent iteration of one or more operations of the computer readable program, determine that the historical user efficacy model associated with the user exists; and generate the user efficacy model further based on the historical user efficacy model.

15. The computer program product of claim 10, wherein to generate the user efficacy model for the user further comprises:

retrieving a group efficacy model associated with the user; and generating the user efficacy model further based on the group efficacy model.

16. The computer program product of claim 10, wherein the computer readable program when executed on the computer causes the computer to also:

retrieve user profile data associated with the user;

retrieve user social data associated with the user;

generate user attribute data associated with the user based on the user profile data and the user social data;

generate the user efficacy model further based on the user attribute data; and generate the set of efficacy scores further based on the user attribute data.

17. The computer program product of claim 10, wherein the computer readable program when executed on the computer causes the computer to also:

identify one or more items consumed by the user;

identify one or more affinity states for the one or more consumed items;

retrieve item social data associated with the one or more consumed items;

generate item attribute data associated with the one or more consumed items based on the one or more affinity states and the item social data;

classify the one or more consumed items into one or more groups;

determine one or more group identifiers that identify the one or more groups; and generate the user efficacy model based on one or more of the item attribute data, the current situation and the one or more group identifiers.

18. The computer program product of claim 10, wherein the computer readable program when executed on the computer causes the computer to also:
- determine a trip start point, a trip stop-off point and a trip end point associated with a trip based on the sensor data;
- retrieve data describing a trip history associated with the user;
- determine a trip offset distance based on one or more of the trip history, the trip start point, the trip stop-off point and the trip end point;
- aggregate device data associated with the mobile computing device;
- generate travel mobility data associated with the mobile computing device, the travel mobility data including one or more of the trip start point, the trip end point, the trip stop-off point, the trip offset distance and the device data; and
- generate the set of efficacy scores further based on the travel mobility data.

19. A system comprising:
- a processor; and
- a memory storing instructions that, when executed, cause the system to:
  - receive identification input data associated with a user;
  - verify an identity of the user using the identification input data;
  - receive sensor data;
  - determine, based on the sensor data and one or more of predefined situation data, a user request history, a user situation history, and map data, a current situation describing a current driving activity associated with the user of a mobile computing device;
  - receive data describing a set of candidate items;
  - classify each candidate item of the set of candidate items into one or more groups;
  - determine one or more group IDs for each candidate item based on one or more of the groups in which the candidate item is classified;
  - determine, for each candidate item, one or more group efficacy models associated with the candidate item, each of the one or more group efficacy models including a particular group of items that includes the candidate item, each of the one or more group efficacy models encoding a bias based on item attributes of the items in the particular group;
  - generate a user efficacy model for the user using the identity of the user, the one or more group efficacy models associated with each of the candidate items of the set, the one or more group IDs associated with each of the one or more of the candidate items of the set, and the current situation describing the current driving activity;
  - generate a set of efficacy scores for the set of candidate items based on the current situation and the user efficacy model associated with the user;
  - eliminate one or more candidate items from the set of candidate items to obtain one or more remaining candidate items;
  - rank the one or more remaining candidate items based on one or more efficacy scores associated with the one or more remaining candidate items; and
  - provide one or more recommendation items to the user from the one or more ranked remaining candidate items.

20. The system of claim 19, wherein the instructions when executed cause the system to also:
- receive stakeholder efficacy data defined by a stakeholder;
- generate the user efficacy model further based on the stakeholder efficacy data; and
- generate the set of efficacy scores further based on the stakeholder efficacy data.

21. The system of claim 19, wherein the instructions when executed cause the system to also:
- aggregate device data associated with the mobile computing device;
- determine device bias data describing one or more scoring preferences configured for the mobile computing device; and
- generate the set of efficacy scores further based on the device data and the device bias data.

22. The system of claim 19, wherein the instructions when executed cause the system to also:
- determine, based on the current situation, a situational bias model that describes one or more situational constraints to be satisfied; and
- generate the user efficacy model further based on the situational bias model.

23. The system of claim 19, wherein the instructions when executed cause the system to also:
- store the user efficacy model as a historical user efficacy model in association with the user;
- upon a subsequent iteration of one or more operations of the instructions, determine that the historical user efficacy model associated with the user exists; and
- generate the user efficacy model further based on the historical user efficacy model.

24. The system of claim 19, wherein to generate the user efficacy model for the user further comprises:
- retrieving a group efficacy model associated with the user; and
- generating the user efficacy model further based on the group efficacy model.

25. The system of claim 19, wherein the instructions when executed cause the system to also:
- retrieve user profile data associated with the user;
- retrieve user social data associated with the user;
- generate user attribute data associated with the user based on the user profile data and the user social data;
- generate the user efficacy model further based on the user attribute data; and
- generate the set of efficacy scores further based on the user attribute data.

26. The system of claim 19, wherein the instructions when executed cause the system to also:
- identify one or more items consumed by the user;
- identify one or more affinity states for the one or more consumed items;
- retrieve item social data associated with the one or more consumed items;
- generate item attribute data associated with the one or more consumed items based on the one or more affinity states and the item social data;
- classify the one or more consumed items into one or more groups;
- determine one or more group identifiers that identify the one or more groups; and
- generate the user efficacy model based on one or more of the item attribute data, the current situation and the one or more group identifiers.

27. The system of claim 19, wherein the instructions when executed cause the system to also:

determine a trip start point, a trip stop-off point and a trip end point associated with a trip based on the sensor data;
retrieve data describing a trip history associated with the user;
determine a trip offset distance based on one or more of the trip history, the trip start point, the trip stop-off point and the trip end point;
aggregate device data associated with the mobile computing device;
generate travel mobility data associated with the mobile computing device, the travel mobility data including one or more of the trip start point, the trip end point, the trip stop-off point, the trip offset distance and the device data; and
generate the set of efficacy scores further based on the travel mobility data.

* * * * *